(12) United States Patent
Xiao et al.

(10) Patent No.: US 11,586,601 B2
(45) Date of Patent: Feb. 21, 2023

(54) APPARATUS AND METHOD FOR REPRESENTATION OF A SPARSE MATRIX IN A NEURAL NETWORK

(71) Applicant: ALIBABA GROUP HOLDING LIMITED, Grand Cayman (KY)

(72) Inventors: Zhibin Xiao, San Mateo, CA (US);
Xiaoxin Fan, San Mateo, CA (US);
Minghai Qin, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 205 days.

(21) Appl. No.: 16/783,069

(22) Filed: Feb. 5, 2020

(65) Prior Publication Data
US 2021/0240684 A1 Aug. 5, 2021

(51) Int. Cl.
G06F 16/22 (2019.01)
G06N 3/02 (2006.01)
G06F 16/174 (2019.01)
G06F 9/30 (2018.01)
G06F 17/16 (2006.01)

(52) U.S. Cl.
CPC ...... *G06F 16/2237* (2019.01); *G06F 9/30018* (2013.01); *G06F 16/1744* (2019.01); *G06F 17/16* (2013.01); *G06N 3/02* (2013.01)

(58) Field of Classification Search
CPC ............ G06F 16/2237; G06F 9/30018; G06F 16/1744; G06F 17/16; G06F 16/901; G06N 3/02; G06N 3/063; G06N 3/082

USPC ........................................................ 707/745
See application file for complete search history.

(56) References Cited

U.S. PATENT DOCUMENTS

| 2007/0198621 A1* | 8/2007 | Lumsdaine | .......... G06K 9/6249 |
| | | | 708/200 |
| 2010/0097652 A1* | 4/2010 | Silverbrook | .......... B41J 13/103 |
| | | | 358/1.15 |

(Continued)

OTHER PUBLICATIONS

Yavits et al., "Sparse Matrix Multiplication on CAM Based Accelerator," e-print arXiv:170509937Cs, May 2017, 5 pages.

(Continued)

*Primary Examiner* — Hicham Skhoun
(74) *Attorney, Agent, or Firm* — Finnegan, Henderson, Farabow, Garrett & Dunner, LLP

(57) ABSTRACT

The present disclosure relates to a method and an apparatus for representation of a sparse matrix in a neural network. In some embodiments, an exemplary operation unit includes a buffer for storing a representation of a sparse matrix in a neural network, a sparse engine communicatively coupled with the buffer, and a processing array communicatively coupled with the sparse engine. The sparse engine includes circuitry to: read the representation of the sparse matrix from the buffer, the representation comprising a first level bitmap, a second level bitmap, and an element array; decompress the first level bitmap to determine whether a block of the sparse matrix comprises a non-zero element; and in response to the block comprising a non-zero element, decompress the second level bitmap using the element array to obtain the block of the sparse matrix. The processing array includes circuitry to execute the neural network with the sparse matrix.

20 Claims, 11 Drawing Sheets

(56) References Cited

U.S. PATENT DOCUMENTS

| | | | |
|---|---|---|---|
| 2010/0106692 A1* | 4/2010 | Moloney | H03M 7/3066 |
| | | | 708/203 |
| 2018/0242020 A1* | 8/2018 | Siddeq | H04N 19/182 |
| 2018/0285733 A1* | 10/2018 | Mellempudi | G06N 3/0454 |
| 2019/0042542 A1* | 2/2019 | Narayanamoorthy | |
| | | | G06F 9/3016 |
| 2020/0012608 A1* | 1/2020 | Woo | G06F 9/3001 |
| 2020/0342632 A1* | 10/2020 | Frumkin | G06T 9/002 |
| 2021/0035258 A1* | 2/2021 | Ray | G06F 15/8046 |
| 2021/0042624 A1* | 2/2021 | Matveev | G06N 3/063 |
| 2021/0125070 A1* | 4/2021 | Wang | G06F 17/16 |
| 2021/0150362 A1* | 5/2021 | Zhang | G06N 3/04 |
| 2021/0150770 A1* | 5/2021 | Appu | G06N 3/0445 |
| 2021/0183002 A1* | 6/2021 | Sharma | G06T 1/20 |
| 2021/0209450 A1* | 7/2021 | Cassidy | G06N 3/063 |

OTHER PUBLICATIONS

Kanellopoulus et al., "SMASH: Co-designing Software Compression and Hardware-Accelerated Indexing for Efficient Sparse Matrix Operations," MICRO-52, 2019, pp. 600-614.

Gondimalla et al., "SparTen: A Sparse Tensor Accelerator for Convolutional Neural Networks," Micro '19, 2019, pp. 151-165.

International Search Report and Written Opinion issued by Patent Cooperation Treaty corresponding the PCT application No. PCT/US21/14314 dated Apr. 7, 2021. (8 pages).

\* cited by examiner

APPARATUS AND METHOD FOR REPRESENTATION OF A SPARSE MATRIX IN A NEURAL NETWORK

BACKGROUND

Modern neural networks (NNs) often include many nodes and many layers. However, this reduces efficiency in execution and increases latency. Accordingly, input sparsity, output sparsity, and weight sparsity have all been proposed, individual or in combination, to increase efficiency and reduce latency. Indeed, sparsity in an artificial neural network more accurately reflects how neurons in a human brain process information. But sparse matrices in neural networks may lead to significant inefficiencies in both storage and computation. For example, they require an unnecessarily large amount of storage space, which is largely occupied by zeros. In addition, computation on sparse matrices involves a large number of unnecessary operations (such as additions and multiplications) on zero elements.

SUMMARY

In some embodiments, an exemplary operation unit includes a buffer for storing a representation of a sparse matrix in a neural network, a sparse engine communicatively coupled with the buffer, and a processing array communicatively coupled with the sparse engine. The sparse engine includes circuitry to: read the representation of the sparse matrix from the buffer, the representation comprising a first level bitmap, a second level bitmap, and an element array; decompress the first level bitmap to determine whether a block of the sparse matrix comprises a non-zero element; and in response to the block comprising a non-zero element, decompress the second level bitmap using the element array to obtain the block of the sparse matrix. The processing array includes circuitry to execute the neural network with the sparse matrix.

In some embodiments, an exemplary processing core includes a local memory and an operation unit communicatively coupled with the local memory. The operation unit includes a buffer for storing a representation of a sparse matrix in a neural network, a sparse engine communicatively coupled with the buffer, and a processing array communicatively coupled with the sparse engine. The sparse engine includes circuitry to: read the representation of the sparse matrix from the buffer, the representation comprising a first level bitmap, a second level bitmap, and an element array; decompress the first level bitmap to determine whether a block of the sparse matrix comprises a non-zero element; and in response to the block comprising a non-zero element, decompress the second level bitmap using the element array to obtain the block of the sparse matrix. The processing array includes circuitry to execute the neural network with the sparse matrix.

In some embodiments, an exemplary method of executing a neural network includes: reading a representation of a sparse matrix, the representation comprising a first level bitmap, a second level bitmap, and an element array; decompressing the first level bitmap to determine whether a block of the sparse matrix comprises a non-zero element; in response to the block comprising a non-zero element, decompressing the second level bitmap using the element array to obtain the block of the sparse matrix; and executing the neural network with the sparse matrix.

In some embodiments, an exemplary non-transitory computer readable storage medium storing a set of instructions that are executable by one or more processing devices to cause an operation unit to perform a method including: reading a representation of a sparse matrix in a neural network, the representation comprising a first level bitmap, a second level bitmap, and an element array; decompressing the first level bitmap to determine whether a block of the sparse matrix comprises a non-zero element; in response to the block comprising a non-zero element, decompressing the second level bitmap using the element array to obtain the block of the sparse matrix; and executing the neural network with the sparse matrix.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems and methods consistent with aspects related to the invention as recited in the appended claims.

There are many conventional sparsity representations of a sparse matrix in neutral network. For example, Compressed Sparse Row (CSR) or Compressed Sparse Column (CSC) employs a format of non-zero elements plus indexes to represent a sparse matrix. These representations may occupy huge memory spaces to store indexes if sparsity of the matrix is not high. In addition, the formats of these representations are difficult for hardware to decompress. Embodiments of present disclosure can improve conventional sparsity representations. For example, in some embodiments of present disclosure, memory space for storing representation of a sparse matrix can be reduced. In some embodiments of present disclosure, representation format is hardware friendly and results in simple decompression process and higher decompression throughput.

It is appreciated that, a matrix or a sparse matrix disclosed herein can be any matrix or sparse matrix. For example, the matrix or sparse matrix can be a weight matrix, an activation matrix, or the like, associated with a neural network. In some embodiments of present disclosure, a sparse matrix in a neural network can be obtained by sparsifying (e.g., pruning) a matrix. Quantization can also be used to reduce a precision of element values (e.g., weights or activations), which may reduce the storage cost and computation.

Figure 1A:
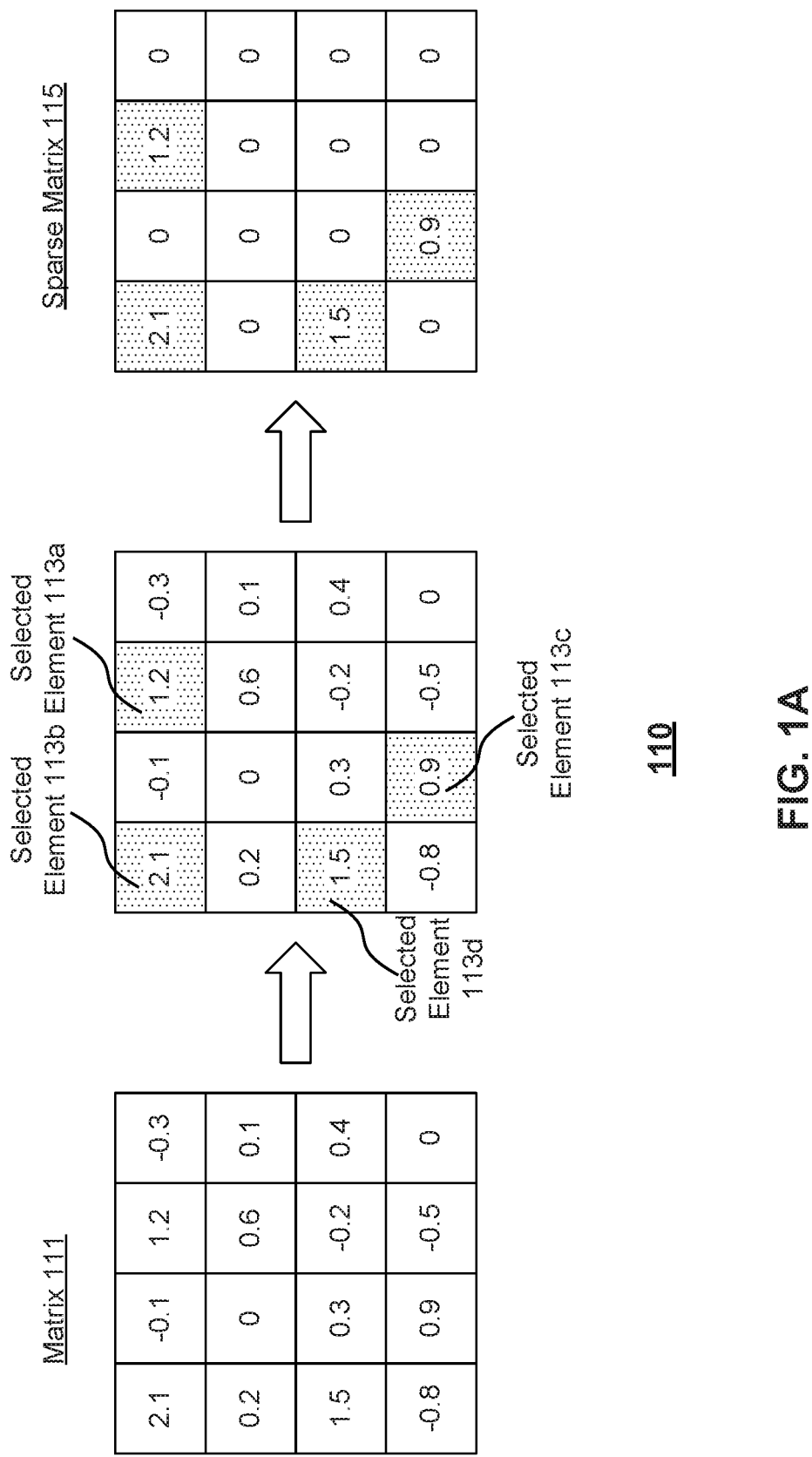
FIG. 1A is a schematic representation of an exemplary sparsifying of a matrix in a neural network, according to some embodiments of the present disclosure.

FIG. 1A is a schematic representation of an exemplary sparsifying 110 of a matrix in a neural network, according to some embodiments of the present disclosure. For example, sparsifying 110 can reduce a matrix 111 to a sparse matrix 115 to reduce a number of calculations required for executing the neural network. Although depicted as a two dimensional (2D) 4×4 matrix, matrix 111 can be of any size or any dimension, such as one dimension (1D) or three dimension (3D).

Accordingly, as depicted in FIG. 1A, sparsifying 110 can include selecting one or more elements, e.g., elements 113a, 113b, 113c, and 113d, from matrix 111. Although depicted as selecting four elements, sparsifying 110 can use any predetermined number of elements. Elements 113a, 113b, 113c, and 113d can be selected on account of having the four largest absolute values. Sparsifying 110 can further include zeroing out non-selected elements, as shown in sparse matrix 115. Accordingly, as depicted in FIG. 1A, sparsifying 110 has enforced 75% sparsity on matrix 111. Moreover, the degree of sparsity may depend on the predetermined number of elements and the size of matrix 111.

Figure 1B:
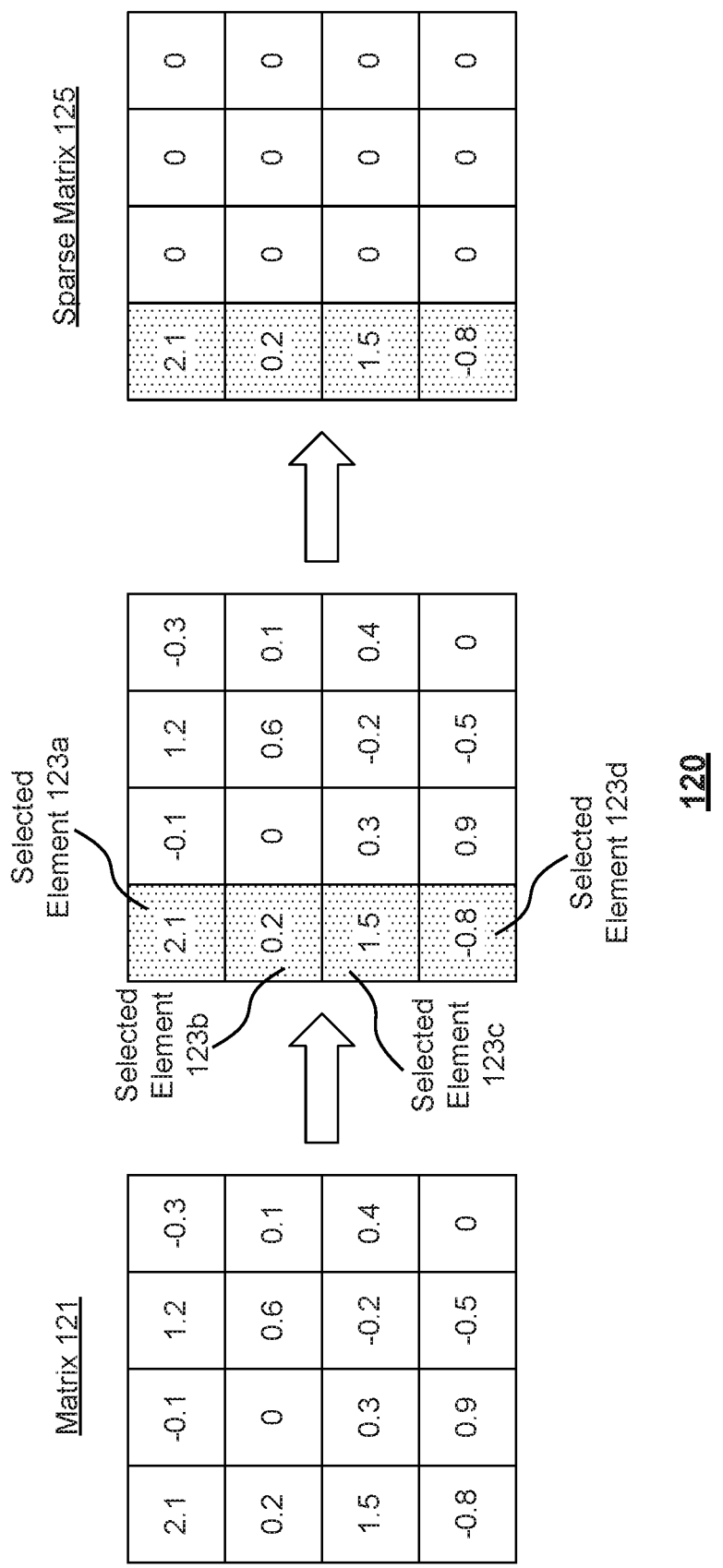
FIG. 1B is a schematic representation of another exemplary sparsifying of a matrix in a neural network, according to some embodiments of the present disclosure.

FIG. 1B is a representation of another exemplary sparsifying 120 of a matrix 121 in a neural network, according to some embodiments of the present disclosure. For example, sparsifying 120 can reduce matrix 121 to a sparse matrix 125 to reduce a number of calculations required for executing the neural network. Although depicted as a 4×4 matrix, matrix 121 can be any size or any dimension, such as one dimension (1D) or three dimension (3D).

Accordingly, as depicted in FIG. 1B, sparsifying 120 can include selecting one or more elements, e.g., elements 123a, 123b, 123c, and 123d, from matrix 121. Although depicted as selecting four elements, sparsifying 120 can use any predetermined number of elements. Elements 123a, 123b, 123c, and 123d can be selected on account of being within a selected column. Although depicted as selecting one column, sparsifying 120 can select any predetermined numbers of blocks, e.g., vectors, columns, rows, filters, channels, or the like. Sparsifying 120 can further include zeroing out non-selected elements, as shown in sparse matrix 125. Accordingly, as depicted in FIG. 1B, sparsifying 120 has enforced 75% sparsity on matrix 121. Moreover, the degree of sparsity can depend on the predetermined number of columns and the size of matrix 121.

Sparsifying 110 of FIG. 1A may not provide spatial predictability in selecting elements not to set to zero because the elements with the largest absolute values may be distributed anywhere in matrix 111. Therefore, sparse matrix 115 of FIG. 1A may have a random non-zero element distribution and an unstructured sparsity. Sparsifying 120 of FIG. 1B can provide a spatial predictability because the non-zero elements are selected according to a certain rule (e.g., first element of each row). Therefore, sparse matrix 125 of FIG. 1B may have a regular non-zero element distribution and a structured sparsity. It is appreciated that, sparsifying 110 of FIG. 1A and sparsifying 120 of FIG. 1B are examples of, rather than limitation to, generation of a sparse matrix, and sparse matrix 115 and sparse matrix 125 are exemplary sparse matrices. For example, the degree by which a matrix is sparsed may depend on the goals for the outcome, as there may be a tradeoff between theoretically a more accurate outcome using less a less aggressive sparsing techniques versus computational savings using a more aggressive sparsing techniques. Embodiments of the present disclosure can use other sparse matrices with different sparsities and non-zero element distributions, and other sparsifying methods.

Figure 2A:
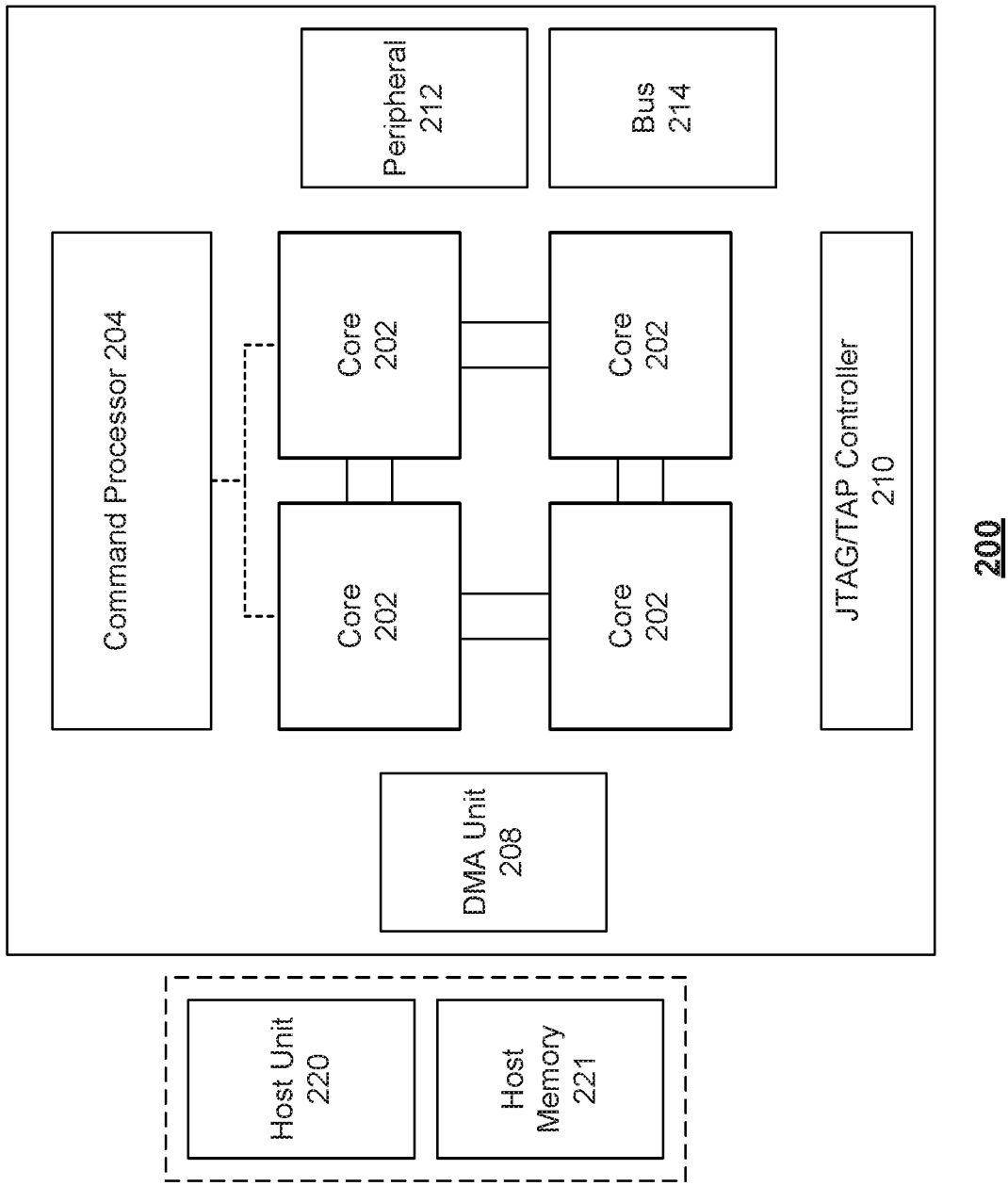
FIG. 2A is a schematic representation of an exemplary neural network heterogeneous acceleration processing unit (HAPU) architecture, according to some embodiments of the present disclosure.

FIG. 2A illustrates an exemplary neural network HAPU architecture 200, according to some embodiments of the present disclosure. In the context of this disclosure, a neural network HAPU may also be referred to as a machine learning accelerator or deep learning accelerator. In some embodiments, HAPU architecture 200 may be referred to as a neural network processing unit (NPU) architecture 200. As shown in FIG. 2A, HAPU architecture 200 can include a plurality of cores 202, a command processor 204, a direct memory access (DMA) unit 208, a Joint Test Action Group (JTAG)/Test Access Port (TAP) controller 210, a peripheral interface 212, a bus 214, and the like.

It is appreciated that cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform the operation on the communicated data packets, cores 202 can include one or more processing elements for processing information in the data packets. Each processing element may comprise any number of processing units. According to some embodiments of the present disclosure, HAPU architecture 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail with respect to FIG. 2B.

Command processor 204 can interact with a host unit 220 and pass pertinent commands and data to corresponding core 202. In some embodiments, command processor 204 can interact with host unit under the supervision of kernel mode driver (KMD). In some embodiments, command processor 204 can modify the pertinent commands to each core 202, so that cores 202 can work in parallel as much as possible. The modified commands can be stored in an instruction buffer (not shown). In some embodiments, command processor 204 can be configured to coordinate one or more cores 202 for parallel execution.

DMA unit 208 can assist with transferring data between host memory 221 and HAPU architecture 200. For example, DMA unit 208 can assist with loading data or instructions from host memory 221 into local memory of cores 202. DMA unit 208 can also assist with transferring data between multiple HAPUs. DMA unit 208 can allow off-chip devices to access both on-chip and off-chip memory without causing a host CPU interrupt. In addition, DMA unit 208 can assist with transferring data between components of HAPU architecture 200. For example, DMA unit 208 can assist with transferring data between multiple cores 202 or within each core. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that HAPU architecture 200 can include a second DMA unit, which can be used to transfer data between other HAPU architectures to allow multiple HAPU architectures to communicate directly without involving the host CPU.

JTAG/TAP controller 210 can specify a dedicated debug port implementing a serial communications interface (e.g., a JTAG interface) for low-overhead access to the HAPU without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the HAPU and other devices.

Bus 214 (such as a I2C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the HAPU with other devices, such as the off-chip memory or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator architecture 200 can also communicate with a host unit 220. Host unit 220 can be one or more processing unit (e.g., an X86 central processing unit). As shown in FIG. 2A, host unit 220 may be associated with host memory 221.

In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within HAPU chip, acting as a higher-level cache. The data stored in host memory 221 may be transferred to HAPU architecture 200 to be used for executing neural network models.

In some embodiments, a host system having host unit 220 and host memory 221 can comprise a compiler (not shown). The compiler is a program or computer software that transforms computer codes written in one programming language into instructions for HAPU architecture 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to HAPU architecture 200. As discussed above, these commands can be further processed by command processor 204 of HAPU architecture 200, temporarily stored in an instruction buffer of HAPU architecture 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into HAPU architecture 200. The loaded instructions may then be distributed to each core (e.g., core 202 of FIG. 2A) assigned with the corresponding task, and the one or more cores may process these instructions.

Figure 2B:
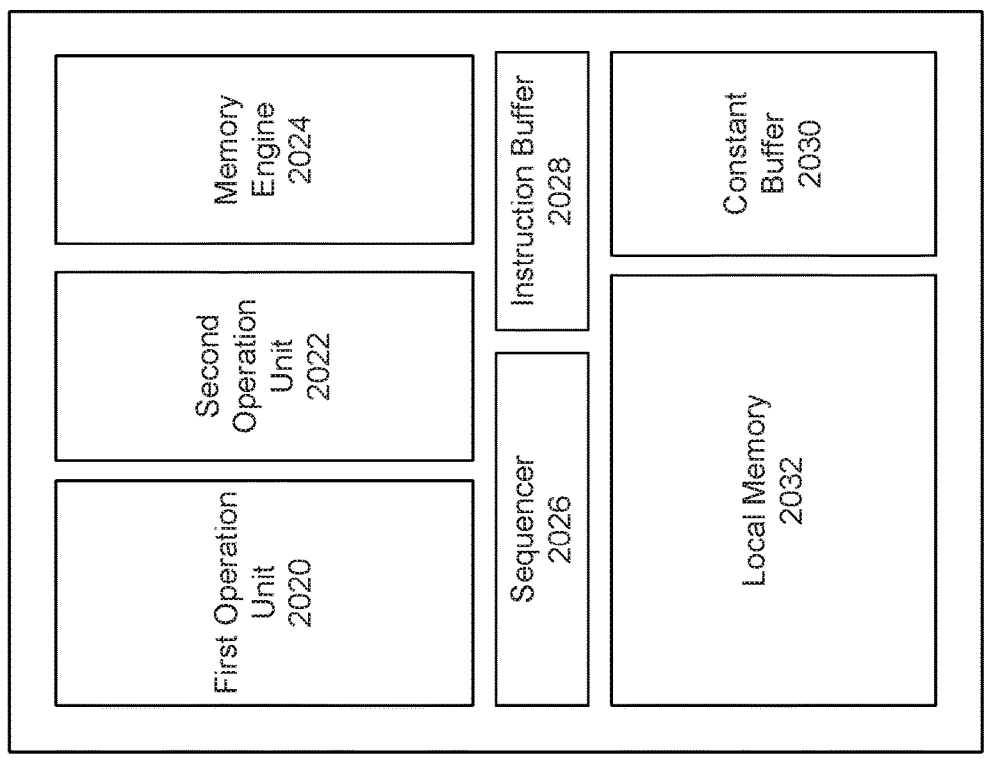
FIG. 2B is a schematic representation of an exemplary neural network HAPU core architecture, according to some embodiments of the present disclosure.

It is appreciated that the first few instructions received by the cores 202 may instruct the cores 202 to load/store data from host memory 221 into one or more local memories of the cores (e.g., local memory 2032 of FIG. 2B). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, HAPU architecture 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, HAPU architecture 200 can further include memory controller (not shown) configured to manage reading and writing of data to and from a specific memory block (e.g., HBM2) within global memory. For example, memory controller can manage read/write data coming from core of another HAPU (e.g., from DMA unit 208 or a DMA unit corresponding to the another HAPU) or from core 202 (e.g., from a local memory in core 202). It is appreciated that more than one memory controller can be provided in HAPU architecture 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While HAPU architecture 200 of FIG. 2A can be used for convolutional neural networks (CNNs) in some embodiments of the present disclosure, it is appreciated that HAPU architecture 200 of FIG. 2A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), tensor processing units (TPUs), any other types of HAPUs, or the like.

FIG. 2B illustrates an exemplary core architecture, according to some embodiments of the present disclosure. As shown in FIG. 2B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2B) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 202 with reduced latency caused by data access. In some embodiments, to minimize data loading latency and energy consumption, static random access memory (SRAM) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2C:
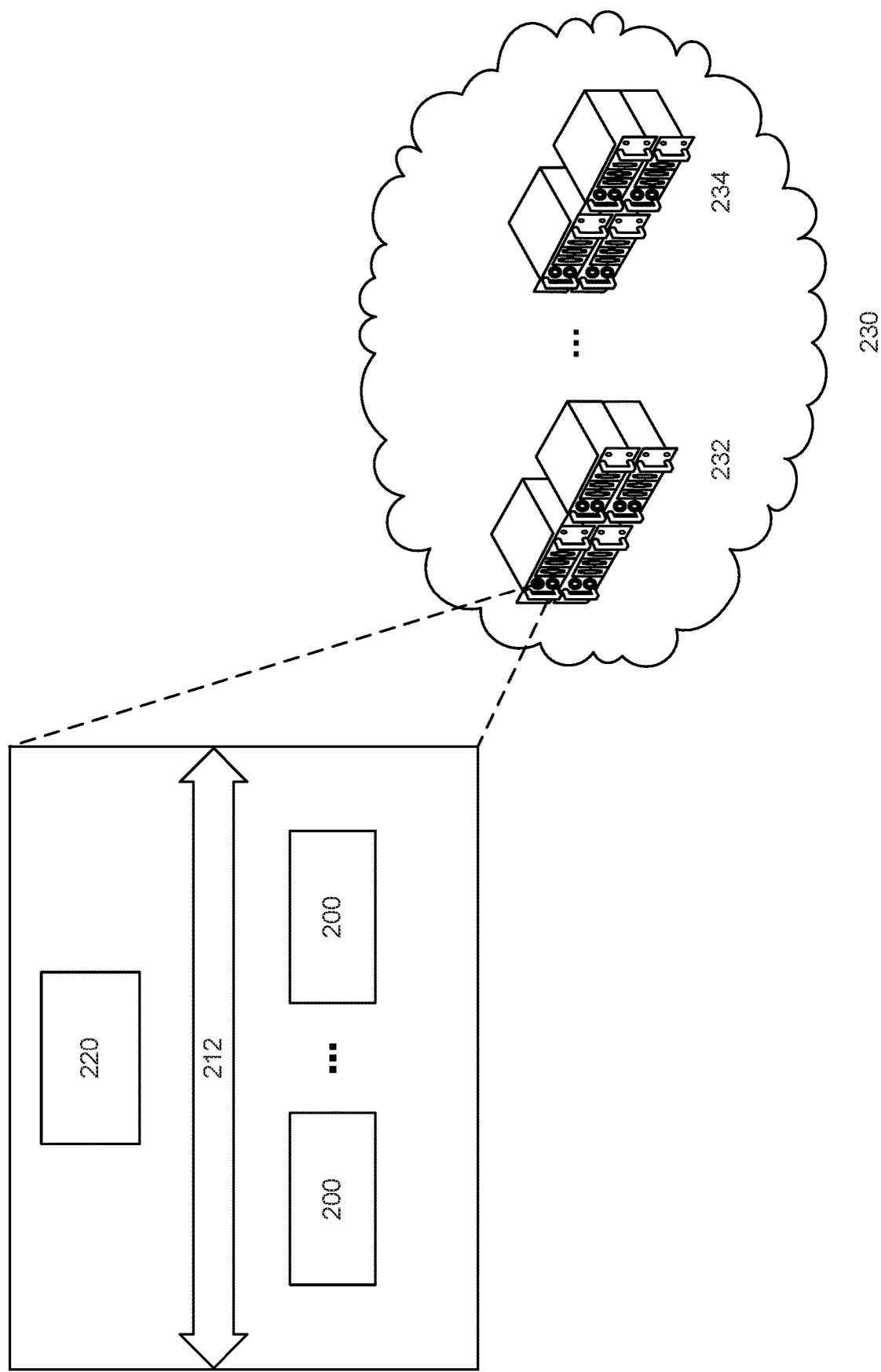
FIG. 2C is a schematic representation of an exemplary cloud system incorporating a neural network HAPU architecture, according to some embodiments of the present disclosure.

FIG. 2C illustrates a schematic diagram of an exemplary cloud system incorporating HAPU architecture 200, according to some embodiments of the present disclosure. As shown in FIG. 2C, cloud system 230 can provide a cloud service with artificial intelligence (AI) capabilities and can include a plurality of computing servers (e.g., 232 and 234). In some embodiments, a computing server 232 can, for example, incorporate a neural network HAPU architecture 200 of FIG. 2A. Neural network HAPU architecture 200 is shown in FIG. 2C in a simplified manner for simplicity and clarity.

With the assistance of neural network HAPU architecture 200, cloud system 230 can provide the extended AI capabilities of image recognition, facial recognition, translations, 3D modeling, and the like. It is appreciated that neural network HAPU architecture 200 can be deployed to computing devices in other forms. For example, neural network HAPU architecture 200 can also be integrated in a computing device, such as a smart phone, a tablet, and a wearable device.

Moreover, while a neural network HAPU architecture is shown in FIGS. 2A-2B, it is appreciated that any HAPU that provides the ability to perform parallel computation can be used.

Figure 3:
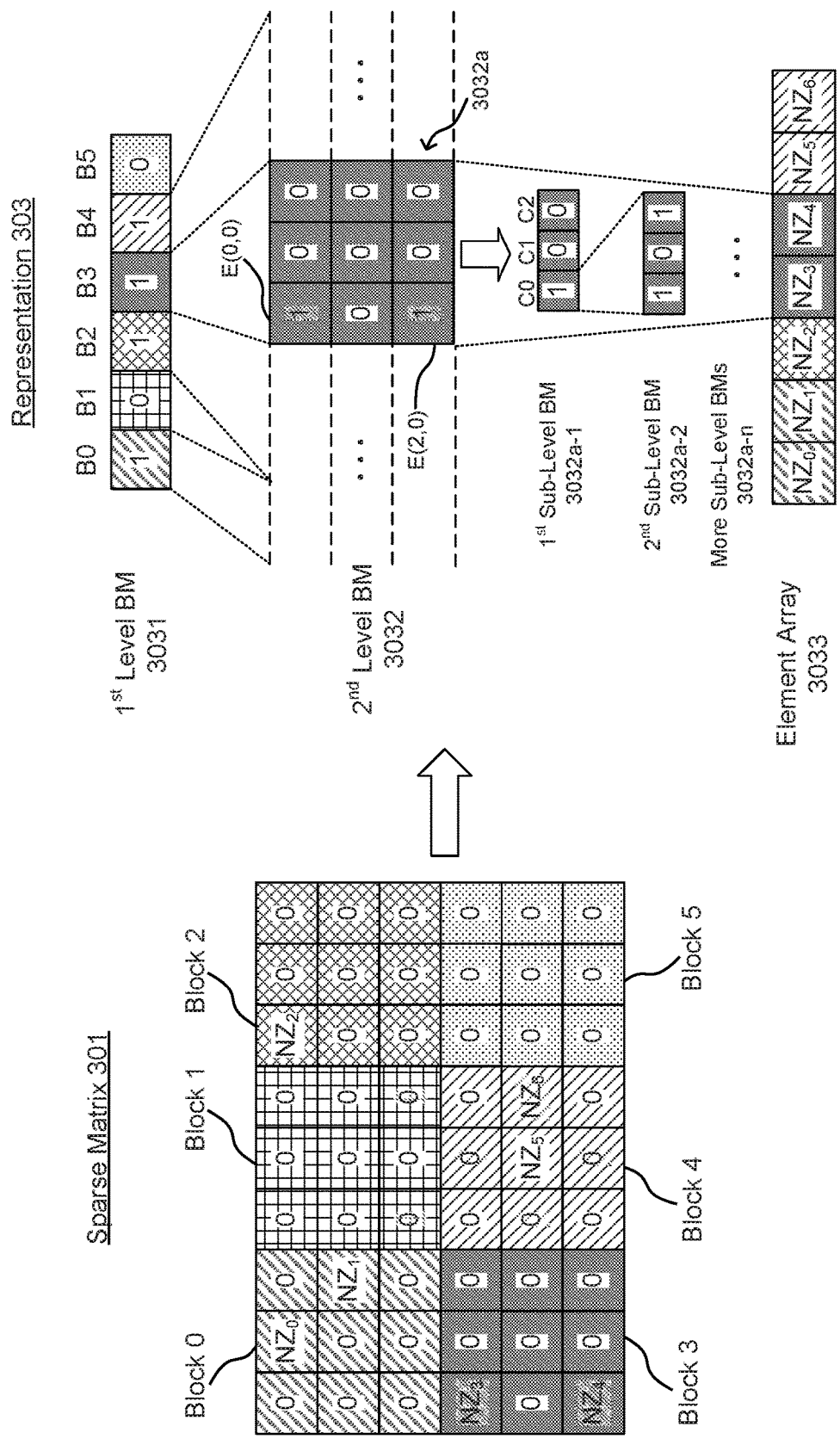
FIG. 3 is a schematic representation of an exemplary representation of a sparse matrix in a neural network, according to some embodiments of the present disclosure.

FIG. 3 is a schematic representation of an exemplary representation 300 of a sparse matrix in a neural network, according to some embodiments of the present disclosure. As shown in FIG. 3, representation 300 can include transforming or compressing a sparse matrix 301 to a representation 303. It is appreciated that, sparse matrix 301 can be any sparse matrix, such as a weight matrix, an activation matrix, or the like, associated with a neural network. Although depicted as a two dimensional (2D) 6×9 matrix, matrix 301 can be of any size or any dimension.

Sparse matrix 301 can include a number of non-zero (NZ) elements, e.g., $NZ_0, NZ_1, \ldots, NZ_6$, distributed randomly or regularly in the matrix. Sparse matrix 301 can be divided into a plurality of blocks. The block can be of any size or shape, including, but not limited to, a square, an oblong, a cube, a cuboid, a vector, a column, a row, a filter, a channel, or the like. In some embodiments, sparse matrix 301 can be divided into blocks according to a hyper parameter, such as a compression ratio, distribution of non-zero elements, sparsifying method, memory requirement, or the like. As shown in FIG. 3, sparse matrix 301 can be divided into six 3×3 blocks, Block 0, Block 1, . . . , Block 5.

Sparse matrix 301 can be represented by a representation 303. Representation 303 can include a plurality of levels of bitmaps (BMs). For example, representation 303 can include a first level BM 3031 to indicate a sparsity in block level, e.g., to indicate whether a block of sparse matrix 301 includes a non-zero element or not. As shown in FIG. 3, first level BM 3031 can include six elements, B0, B1, . . . , B5, each of which can indicate whether a corresponding block, Block 0, Block 1, . . . , or Block 5, includes a non-zero element or not. B0, B1, . . . , and B5 corresponds to Block 0, Block 1, . . . , and Block 5, respectively. B0 is set to 1 to indicate Block 0 has at least one non-zero element, while B1 is set to 0 to indicate Block 1 does not have any non-zero element, and so on. Although first level BM 3031 is shown as a vector, it can be of any other size or form, such as a 2D matrix.

Additionally, representation 303 can also include a second level BM 3032 to indicate sparsity of each block, e.g., to indicate, for each block with a non-zero element, whether an element of the block is a non-zero element. For example, second level BM 3032 can include one or more parts (e.g., part 3032a), each of which is corresponding to a block with a non-zero element. For a block not having a non-zero element (e.g., Block 1 or Block 5) or for a zero element in first level BM 3031 (e.g., B1 or B5), second level BM 3032 does not have a corresponding part. The one or more parts can be arranged in second level BM 3032 in a structure corresponding to a structure of first level BM 3031. Each part of second level BM 3032 can include a plurality of elements, and each element can indicate whether an element in the corresponding block is a non-zero element. As shown in FIG. 3, for example, part 3032a of second level BM 3032 corresponds to B3 of first level BM 3031 or Block 3 of sparse matrix 301. Block 3 of spare matrix 301 includes two non-zero elements, $NZ_3$ at position (0, 0) and $NZ_4$ at position (2, 0). Part 3032a of second level BM 3032 can include two elements, E(0, 0) at position (0, 0) and E(2, 0) at position (2, 0), that are set to 1 to indicate that there are non-zero elements at these positions. Although shown as a 3×N matrix, second level BM 3032 can be of any other size or form, such as a 1D matrix.

In some embodiments, representation 303 can include an element array 3033 that can have all non-zero elements of sparse matrix 301, such as $NZ_0$, $NZ_1$, . . . , $NZ_6$. The non-zero elements can be arranged in a structure corresponding to a structure of second level BM 3032. As shown in FIG. 3, for example, $NZ_3$, $NZ_4$ are arranged to correspond to part 3032a of second level BM 3032 that is corresponding to B3 of first level BM 3031 and thus to Block 3 of sparse matrix 301. Specifically, $NZ_3$ and $NZ_4$ are corresponding to E(0, 0) and E(2, 0) in part 3032a of second level BM 3032, respectively.

In some embodiments, a part of second level BM 3032 (e.g., part 3032a) can be further divided into a plurality of sub-blocks, and represented with a first sub-level BM and a second sub-level BM. Similar to first level BM 3031, first sub-level BM 3032a-1 can include a plurality of elements to indicate a sparsity in sub-block level, e.g., to indicate whether a sub-block of the part 3032a of second level BM 3032 includes a non-zero element or not. For example, part 3032a of second level BM 3032 can be divided into three columns. First sub-level BM 3032a-1 can include three elements, C0, C1 and C2, to indicate whether each column of part 3032a includes a non-zero element. C0, C1 and C2 are corresponding to left, middle and right columns of part 3032a, respectively. Since the left column of part 3032a includes two non-zero elements, E(0, 0) and E(2, 0), and the middle and right columns of part 3032a only include zero elements, C0 is set to 1, while C1 and C2 are both set to 0. Although shown as a vector with three elements, first sub-level BM 3032a-1 can be of any other size or form.

Similar to second level BM 3032, second sub-level BM 3032a-2 can include one or more parts to indicate, for a sub-block with a non-zero element, whether an element of the sub-block is a non-zero element. In some embodiments, for a sub-block not having a non-zero element (e.g., the middle column or right column of part 3032a) or for a zero element in first sub-level BM (e.g., C2 or C3 of first sub-level BM 3032a-1), second sub-level BM (e.g., second sub-level BM 3032a-2) does not have a corresponding part. Each part of second sub-level BM 3032a-2 can include a plurality of elements, and each element can indicate whether an element in the corresponding sub-block of part 3032a of second level BM 3032 is a non-zero element. The structure of first sub-level BM 3032a-1 can be corresponding to that of second level BM 3032, and the structure of second sub-level BM 3032a-2 can be corresponding to that of the first sub-level BM 3032a-1. For example, as shown in FIG. 3, second sub-level BM 3032a-2 has one part corresponding to C0 of first sub-level BM 3032a-1 and left column of second level BM 3032. The part of second sub-level BM 3032a-2 can include three elements (1, 0, 1) corresponding to three elements in left column of part 3032a of second level BM 3032 and indicating whether they are non-zero elements. Although shown as a vector with three elements, second sub-level BM 3032a-2 can be of any other size or form.

It is appreciated that, in some embodiments, there can be more deep sub-level BMs 3032a-n. For example, similar to sparse matrix 301 or part 3032a of second level BM 3032, second sub-level BM 3032a-2 can be divided into a plurality of sub-blocks, and represented by other deeper sub-level BMs.

Although depicted as three separate data, in some embodiments, first level BM 3031, second level BM 3032 and element array 3033 can be combined with each other. For example, first level BM 3031 and second level BM 3032 can be combined together in such a manner that an element (e.g., B3) of first level BM 3031 is followed by a corresponding part (e.g., part 3032a) of second level BM 3032. As another example, second level BM 3032 can be combined with element array 3033 in such a manner that a part (e.g., part 3032a) of second level BM 3032 is followed by corresponding non-zero elements (e.g., $NZ_3$ and $NZ_4$) of element array 3033. As another example, first level BM 3031, second level BM 3032 and element array 3033 can be combined such that an element (e.g., B3) of first level BM 3031 is followed by a corresponding part (e.g., part 3032a) of second level BM 3032 that is followed by corresponding non-zero elements (e.g., $NZ_3$ and $NZ_4$) of element array 3033.

Figure 4:
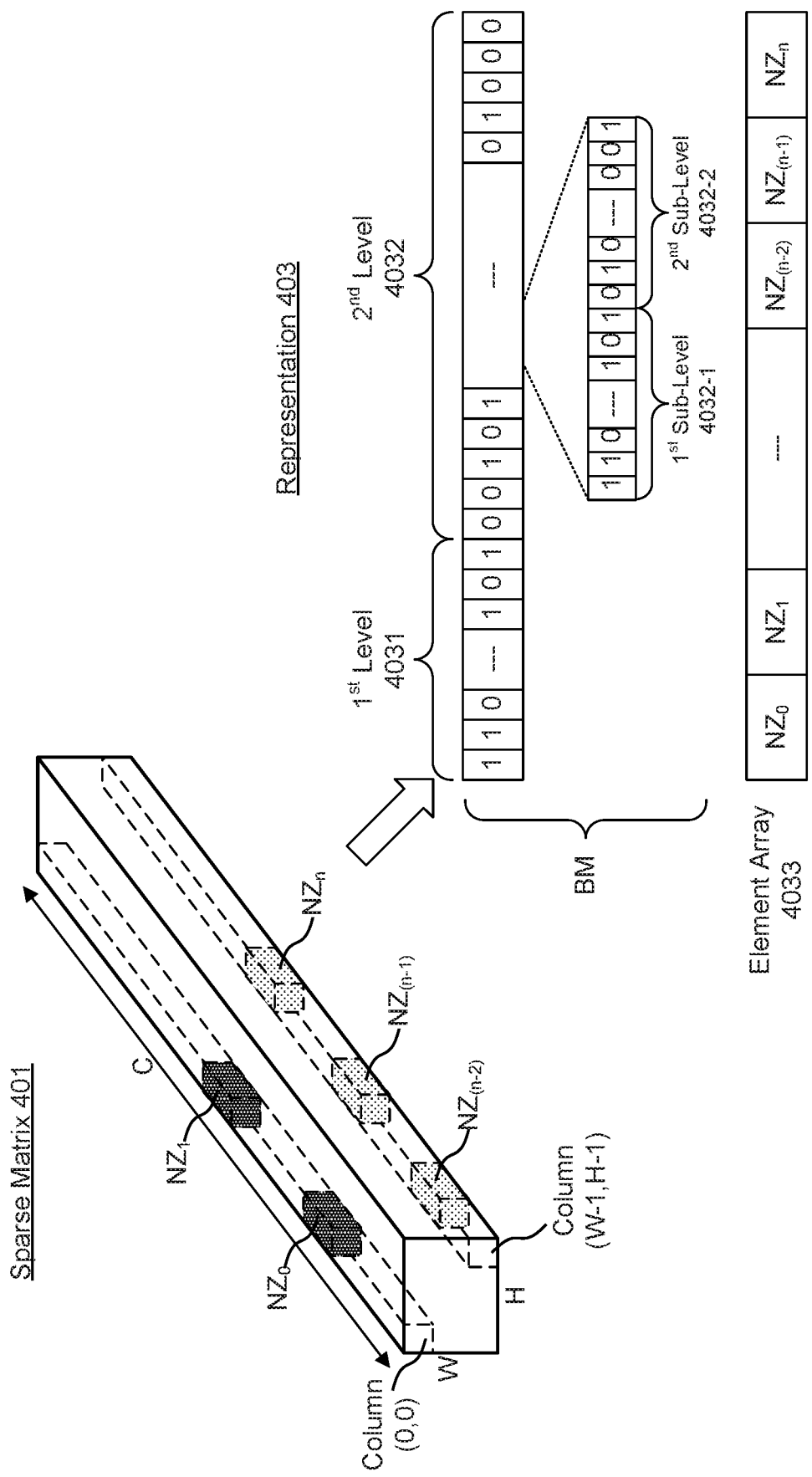
FIG. 4 is a schematic representation of another exemplary representation of a sparse matrix in a neural network, according to some embodiments of the present disclosure.

FIG. 4 is a schematic representation of another exemplary representation 400 of a sparse matrix in a neural network, according to some embodiments of the present disclosure.

As shown in FIG. 4, representation 400 can include transforming or compressing a sparse matrix 401 to a representation 403. It is appreciated that, sparse matrix 401 can be any sparse matrix, such as a weight matrix, an activation matrix, or the like, associated with a neural network. Although depicted as a 3D matrix, matrix 401 can be of any size or any dimension.

Sparse matrix 401 is a W×H×C 3D matrix, and can include a number of non-zero (NZ) elements distributed randomly or regularly in the matrix 401. Sparse matrix 401 can be divided into a plurality of blocks. The block can be of any size or shape, including, but not limited to, a square, an oblong, a cube, a cuboid, a vector, a column, a row, a filter, a channel, or the like. As shown in FIG. 4, sparse matrix 401 can be divided into a plurality of columns, e.g., N columns, where N=W×H. For example, column (0, 0) can include two non-zero elements $NZ_0$ and $NZ_1$, and column (W−1, H−1) can include three non-zero elements, $NZ_{(n-2)}$, $NZ_{(n-1)}$ and $NZ_n$.

Sparse matrix 401 can be represented by a representation 403. Representation 403 can include a plurality of levels of BMs. For example, representation 403 can include a first level BM 4031, a second level BM 4032, and the like. First level BM 4031 can indicate whether a column of sparse matrix 401 includes a non-zero element or not. As shown in FIG. 4, first level BM 4031 can include a plurality of elements (e.g., N elements), each of which can indicate whether a corresponding column includes a non-zero element or not. An element of first level BM 4031 can be set to 1 if its corresponding column has one or more non-zero elements, or set to 0 if its corresponding column does not have any non-zero element.

Second level BM 3032 can indicate, for each column with one or more non-zero elements, whether an element of the column is a non-zero element. For example, second level BM 3032 can include one or more parts, each part corresponding to a column of sparse matrix 401. For a column not having a non-zero element or for a zero element in first level BM 4031, second level BM 4032 does not have a corresponding part. In some embodiments, the one or more parts of second level BM 4032 can be arranged in a structure corresponding to a structure of first level BM 4031. Each part of second level BM 4032 can include a plurality of elements, and each element can indicate whether an element in the corresponding column is a non-zero element or a zero element.

It is appreciated that, although shown as a combined vector, first level BM 4031 and second level BM 4032 can be of any other size or form. For example, first level BM 4031 or second level BM 4032 can be separate vector or 2D matrix, or can be combined in another structure, such as an element of first level BM 4031 followed by its corresponding part of second level BM 4032.

As shown in FIG. 4, representation 403 can also include an element array 4033 that can have all non-zero elements of sparse matrix 401, such as $NZ_0$, $NZ_1$, ..., $NZ_{(n-2)}$, $NZ_{(n-1)}$, $NZ_n$. The non-zero elements can be arranged in a structure corresponding to a structure of second level BM 4032.

In some embodiments, a part (e.g., a vector) of second level BM 4032 can be further divided into a plurality of sub-blocks (e.g., sub-vectors), and represented with a first sub-level BM 4032-1 and a second sub-level BM 4032-2. Similar to first level BM 4031, first sub-level BM 4032-1 can include a plurality of elements, each element indicating whether a sub-block of the part of second level BM 4032 includes a non-zero element or not. For example, a vector of second level BM 4032 can be divided into a number of sub-vectors. First sub-level BM 3032-1 can include the same number of elements as that of the sub-vectors, each element indicating whether a sub-vector of the vector includes a non-zero element.

Similar to second level BM 4032, second sub-level BM 4032-2 can include one or more parts to indicate, for a sub-block with a non-zero element, whether an element of the sub-block is a non-zero element. In some embodiments, for a sub-block without a non-zero element or for a zero element in first sub-level BM 4032-1, second sub-level BM 3032-2 does not include a corresponding part. Each part of second sub-level BM 4032-2 can include a plurality of elements, and each element can indicate whether an element in the corresponding sub-block of the part of second level BM 4032 is a non-zero element.

In some embodiments, the structure of first sub-level BM 4032-1 can be corresponding to that of second level BM 4032, and the structure of second sub-level BM 4032-2 can be corresponding to that of the first sub-level BM 4032-1. Although shown as vectors, first and second sub-level BMs 4032-1 and 4032-2 can be of any other size or form.

It is appreciated that, in some embodiments, there can be more deep sub-level BMs. For example, similar to sparse matrix 401 or a part of second level BM 4032, second sub-level BM 4032-2 can be divided into a plurality of sub-blocks, and represented by other deeper sub-level BMs.

In some embodiments, element array 4033 can be combined with first level BM 4031 or second level BM 4032. For example, element array 4033 and second level BM 4032 can be combined together in such a manner that a part of second level BM 4032 corresponding to a column of sparse matrix 401 is followed by its corresponding non-zero elements of element array 4033.

Figure 5A:
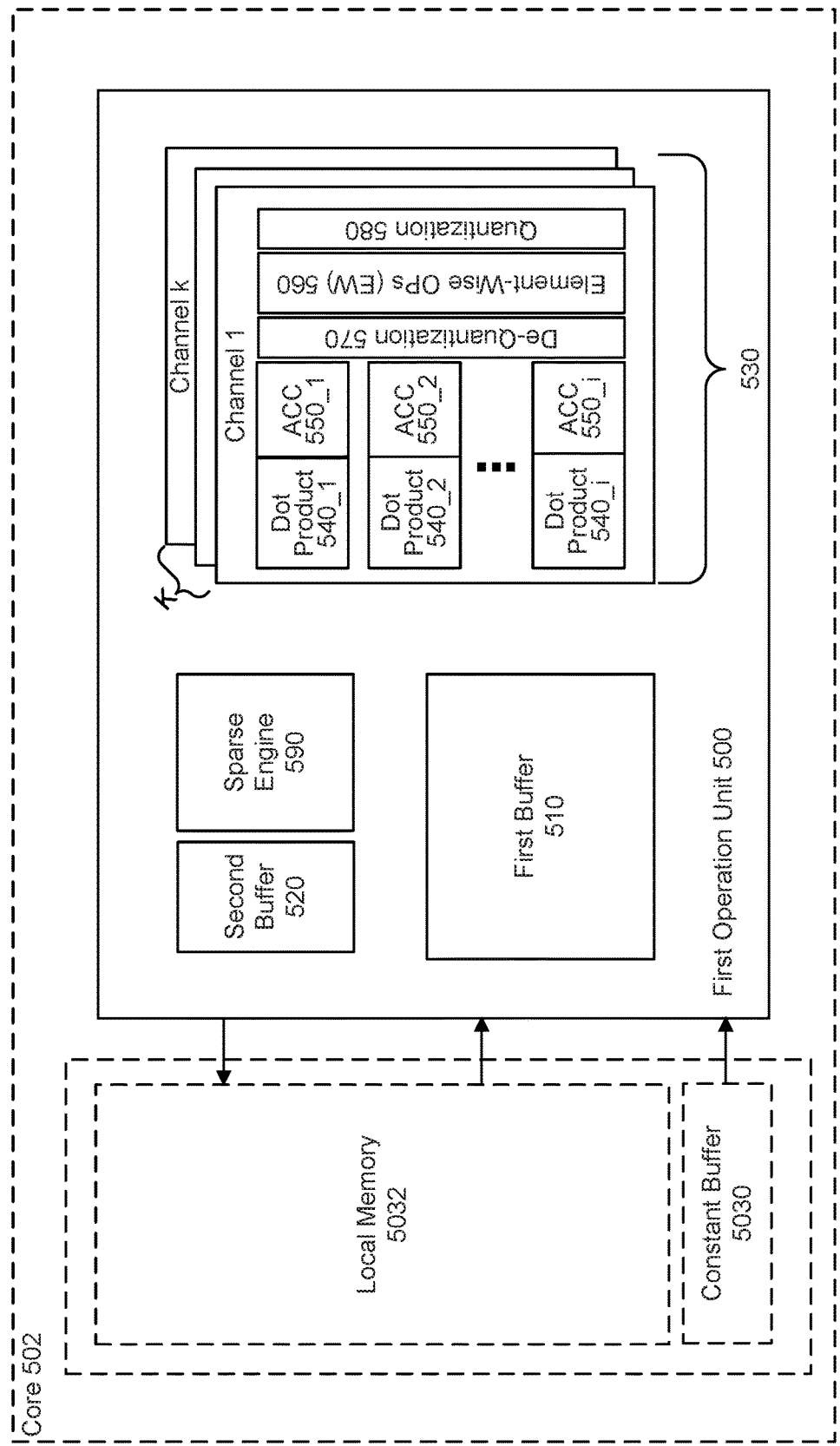
FIG. 5A is a schematic representation of an exemplary operation unit, according to some embodiments of the present disclosure.

FIG. 5A is a schematic representation of an exemplary operation unit configuration 500, according to some embodiments of the present disclosure. In some embodiments, operation unit 500 can be first operation unit (e.g., first operation unit 2020 of FIG. 2B) included in a core 502 (e.g., core 202 of FIGS. 2A-2B). Operation unit 500 can include a first buffer 510, a second buffer 520, and a processing array 530.

First buffer 510 can be configured to store input data. In some embodiments, data stored in first buffer 510 can be input data (e.g. input features) to be used in processing array 530 for execution. In some embodiments, the input data can be fetched from local memory 5032 (e.g., local memory 2032 in FIG. 1B). First buffer 510 can be configured to support reuse or share of data to be used in processing array 530. In some embodiments, input data stored in first buffer 510 can be activation data for a convolution operation.

Second buffer 520 can be configured to store matrix data, such as a representation of sparse matrix (e.g. weight matrix). For example, operation unit 500 can read, fetch or receive the representation from local memory 5032 through a memory engine (not shown, e.g., memory engine 2024 of FIG. 2B), and store the representation in second buffer 520. In some embodiments, second buffer 520 can be a part of or separate from first buffer 510. Second buffer 520 can be any suitable memory that provides storage space for data such as matrix or representation, such as a register, Dynamic Random Access Memory (DRAM), Static Random Access Memory (SRAM), or the like.

Figure 5B:
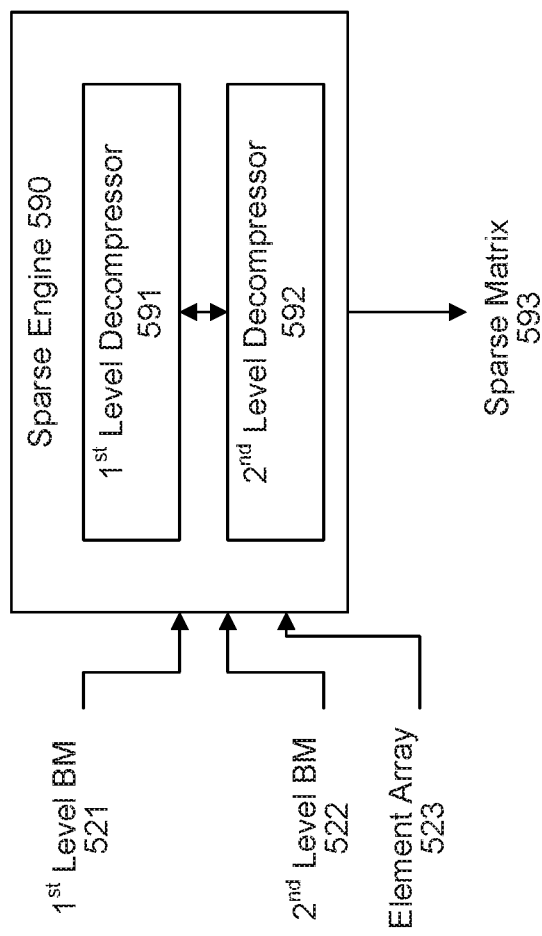
FIG. 5B is a schematic representation of an exemplary sparse engine, according to some embodiments of the present disclosure.

Operation unit 500 can also include a sparse engine 590 communicatively coupled with second buffer 520 and configured to read data from or write data to second buffer 520. As shown in FIG. 5B, sparse engine 590 can include one or more decompressors, such as first level decompressor 591 and second level decompressor 592, to decompress the representation. In some embodiments, sparse engine 590, first level decompressor 591 or second level decompressor 592 can be implemented as a circuitry with high processing speed. Sparse engine 590 can read a representation of a sparse matrix in a neural network (e.g., representation 303 of FIG. 3, representation 403 of FIG. 4, or the like), including first level BM 521 (e.g. first level BM 3031 of FIG. 3, first level BM 4031 of FIG. 4, or the like), second level BM 522 (e.g. second level BM 3032 of FIG. 3, second level BM 4032 of FIG. 4, or the like) and element array 523 (e.g. element array 3033 of FIG. 3, element array 4033 of FIG. 4, or the like), from second buffer 520. In some embodiments, the representation can also include one or more sub-level BMs (e.g., first sub-level BM 3032*a*-1, second sub-level BM 3032*a*-2, more sub-level BMs 3032*a*-*n* of FIG. 3, first sub-level BM 4032-1, second sub-level BM 4032-2 of FIG. 4, or the like). Decompressors of sparse engine 590 can include circuitry to communicatively couple them and allow them to cooperate with each other to decompress the representation. For example, first level decompressor 591 and second level decompressor 592 can be coupled and communicate with each other. First level decompressor 591 can decompress first level BM 521 to determine whether a block of sparse matrix includes a non-zero element. For example, an element of the first level BM can be set to 1 to indicate its corresponding block includes a non-zero element. If the block includes a non-zero element, second level decompressor 592 can decompress second level BM 522 with element array 523 to obtain the block of sparse matrix. For example, second level decompressor 592 can use the second level BM as bitmask to reconstruct the sparse matrix with element array. An element of the second level BM is set to 1 to indicate its corresponding element is a non-zero element included in the element array. In some embodiments, the obtained block of sparse matrix is the same as the original block. In some embodiments, the obtained block of sparse matrix is a variant of the original block that may be more hardware-friendly for computations. First level decompressor 591 can combine obtained blocks to obtain the sparse matrix 593 or a variant thereof. Although shown as two separate units, in some embodiments, first level decompressor 591 and second level decompressor 592 can be combined as one decompressor.

For example, in combination with FIG. 3, sparse engine 590 can read a representation 303 including first level BM 3031, second level BM 3032 and element array 3033 from second buffer 520. First level decompressor 591 can decompress first level BM 3031, e.g., checking each element, B0, B1, ..., or B5, of first level BM 3031, to determine whether a block of sparse matrix 301 includes a non-zero element. Elements B0, B2-4 are set to 1, indicating that Block 0 and Blocks 2-4 of sparse matrix 301 have non-zero elements, while B1 and B5 are set to 0, indicating that Block 1 and Block 5 of sparse matrix 301 do not have any non-zero element. For elements B0, B2-4 of first level BM 3031 or for Blocks 0 and 2-4 of sparse matrix 301, second level decompressor 592 can decompress second level BM 3032 with element array 3033, to obtain Block 0 and Blocks 2-4 of sparse matrix 301. For example, second level decompressor 592 can read second level BM 3022 and check each element of second level BM 3022. For part 3032*a* that corresponds to B3 or Block 3, elements E(0, 0) and E(2, 0) are set to 1 and corresponding to non-zero elements $NZ_3$ and $NZ_4$, respectively, of element array 3033. Second level decompressor 5002 can reconstruct Block 3 by placing $NZ_3$ and $NZ_4$ at positions (0, 0) and (2, 0), respectively, and filling all other positions with 0s. Similarly, Block 0, Block 2 and Block 4 can also be reconstructed. Then, sparse engine 590 can combine reconstructed blocks to transform the representation 303 to sparse matrix 301 or a variant of sparse matrix 301.

In some embodiments, the representation read by sparse engine 590 can also include one or more sub-level BMs (not shown), such as a first sub-level BM and second sub-level BM. Sparse engine 590 can include more decompressors to process one or more sub-level BMs. In some embodiments, first level decompressor 591 and second level decompressor 592 can process the one or more sub-level BMs. For example, first level decompressor 591 (or a first sub-level decompressor (not shown)) can decompress first sub-level BM to determine whether a sub-block of a part of second level BM 522 includes a non-zero element. If the sub-block includes a non-zero element, second level decompressor 592 (or a second sub-level decompressor (not shown)) can decompress second sub-level BM to obtain the sub-block of the part of second level BM 522.

For example, in combination with FIG. 3, sparse engine 590 can read a representation 303 including first sub-level BM 3032*a*-1 and second sub-level BM 3032*a*-2 from second buffer 520. First level decompressor 591 can decompress first sub-level BM 3032*a*-1, e.g., checking each element, C0, C1 or C2, of first sub-level BM 3032*a*-1, to determine whether a sub-block (e.g., column) of part 3032*a* includes a non-zero element. Element C0 is set to 1, indicating that the left column of part 3032*a* has one or more non-zero elements, while C1 and C2 are set to 0, indicating that the middle and right columns of part 3032*a* do not have any non-zero element. For element C0 of first sub-level BM 3032*a*-1 or for the left column of part 3032*a*, second level decompressor 592 can decompress second sub-level BM 3032*a*-2, to obtain the left column of part 3032*a*. For example, second level decompressor 592 can read second sub-level BM 3032*a*-2 and reconstruct the left column of part 3032*a* with second sub-level BM 3032*a*-2. Second level decompressor 592 can reconstruct the middle and right columns of part 3032*a* with 0s. Similarly, sparse engine 590 can reconstruct other parts of the second level BM 3032, and decompress the second level BM 3032 to obtain sparse matrix 301.

Operation unit 500 can also include processing array 530 that can have a plurality of layers (e.g., K layers). According to some embodiments of the present disclosure, each layer of processing array 530 can include a plurality of processing strings, which may perform computations in parallel. For example, first processing string included in the first layer of processing array 530 can comprise a first multiplier (e.g., dot product) 540_1 and a first accumulator (ACC) 550_1 and second processing string can comprise a second multiplier 540_2 and a second accumulator 550_2. Similarly, $i^{th}$ processing string in the first layer can comprise an $i^{th}$ multiplier 540_*i* and an $i^{th}$ accumulator 550_*i*.

In some embodiments, processing array 530 can perform computations under SIMD control. For example, when performing a convolution operation, each layer of processing array 530 can execute same instructions with different data.

According to some embodiments of the present disclosure, processing array 530 shown in FIG. 5A can be included in a core (e.g., core 202 in FIG. 2A or FIG. 2B). When a number of processing strings (e.g., i number of processing strings) included in one layer of processing array 530 is smaller than a number of work items (e.g., B number of work items), i number of work items can be executed by processing array 530 and subsequently the rest of work items (B-i number of work items) can be executed by the processing array 530 in some embodiments. In some other embodiments, i number of work items can be executed by processing array 530 and the rest of work items can be executed by another processing array 530 in another core.

According to some embodiments of the present disclosure, processing array 530 can further include an element-wise operation processor (OP) 560. In some embodiments, element-wise operation processor 560 can be positioned at the end of processing strings. In some embodiments, processing strings in each layer of processing array 530 can share element-wise operation processor 560. For example, i number of processing strings in the first layer of processing array 530 can share element-wise operation processor 560. In some embodiments, element-wise operation processor 560 in the first layer of processing array 530 can perform its element-wise operation on each of output values, from accumulators 550_1 to 550_i, sequentially. Similarly, element-wise operation processor 560 in the Kth layer of processing array 530 can perform its element-wise operation on each of output values, from accumulators 550_1 to 550_i, sequentially. In some embodiments, element-wise operation processor 560 can be configured to perform a plurality of element-wise operations. In some embodiments, element-wise operation performed by the element-wise operation processor 560 may include an activation function such as ReLU function, ReLU6 function, Leaky ReLU function, Sigmoid function, Tan h function, or the like.

In some embodiments, multiplier 540 or accumulator 550 may be configured to perform its operation on different data type from what the element-wise operation processor 560 performs its operations on. For example, multiplier 540 or accumulator 550 can be configured to perform its operations on integer type data such as Int 8, Int 16, and the like and element-wise operation processor 560 can perform its operations on floating point type data such as FP24, and the like. Therefore, according to some embodiments of the present disclosure, processing array 530 can further include de-quantizer 570 and quantizer 580 with element-wise operation processor 560 positioned therebetween. In some embodiments, batch normalization operations can be merged to de-quantizer 570 because both de-quantizer 570 and batch normalization operations can be performed by multiplication operations and addition operations with constants, which can be provided from constant buffer 5030 (e.g., constant buffer 2030 of FIG. 2B). In some embodiments, batch normalization operations and de-quantization operations can be merged into one operation by compiler. As shown in FIG. 5A, constant buffer 5030 can provide constants to de-quantizer 570 for de-quantization or batch normalization.

Sparse engine 590 can provide decompressed sparse matrix 593 to processing array 530, and processing array 530 can perform a computation (e.g., addition, multiplication, multiply-accumulate, convolution, or the like) on the decompressed sparse matrix. In some embodiments, processing array 530 can read input features from first buffer 510 and use them in a computation.

Figure 6:
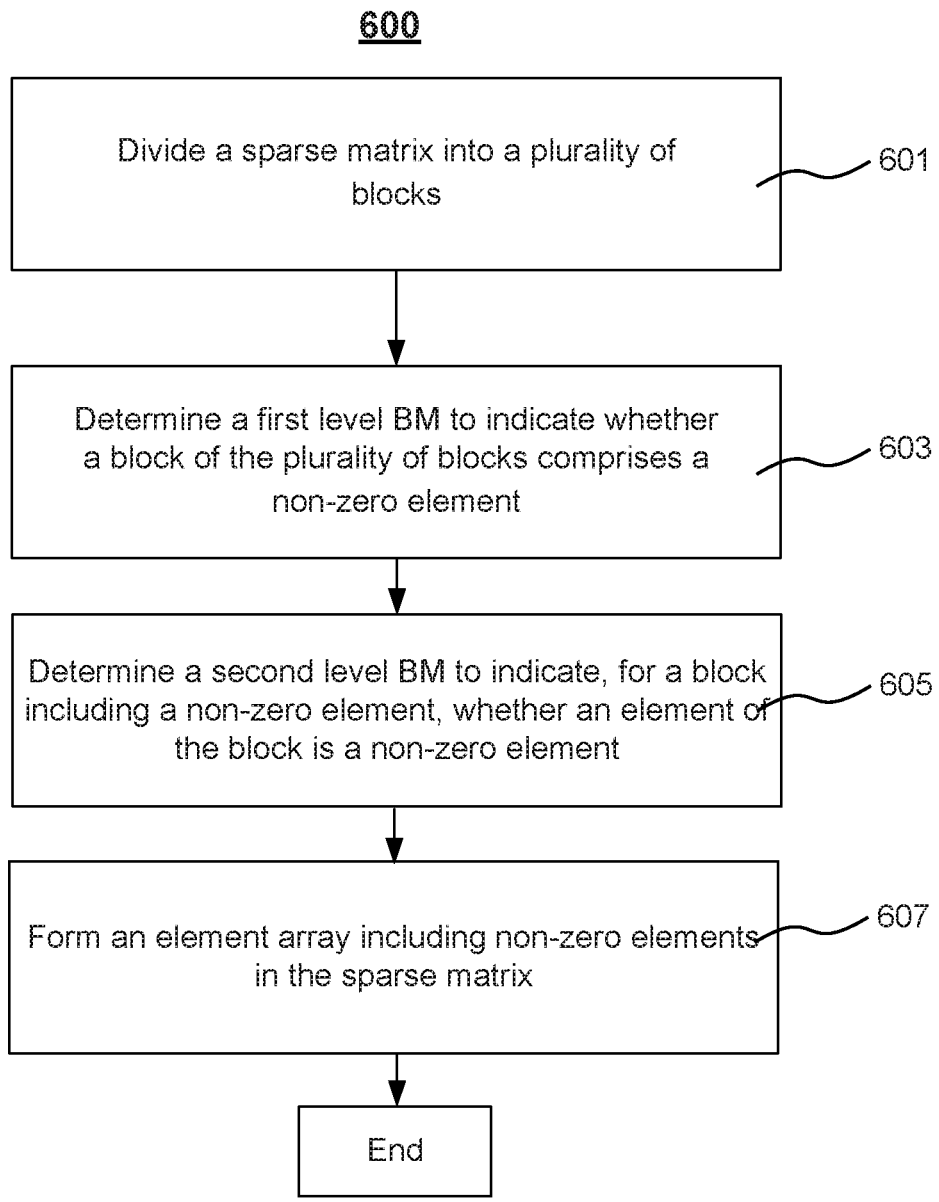
FIG. 6 is a flowchart of an exemplary method for representing a sparse matrix in a neural network, according to some embodiments of the present disclosure.

FIG. 6 illustrates a flowchart of an exemplary method 600 for representing a sparse matrix in a neural network, according to some embodiments of the present disclosure. Method 600 can be implemented by neural network HAPU architecture 200 of FIG. 2A or FIG. 2C. Moreover, method 600 can also be implemented by a computer program product, embodied in a computer-readable medium, including computer-executable instructions, such as program code, executed by computers. In some embodiments, a host unit (e.g., host unit 220 of FIG. 2A or 2C) may compile software code for generating instructions for providing to one or more HAPUs to perform method 600.

As shown in FIG. 6, at step 601, a sparse matrix can be divided into a plurality of blocks. The sparse matrix can be of any size or dimension. In some embodiments, the sparse matrix can be a sparse weight matrix or a sparse activation matrix. The block can be of any size or shape, including, but not limited to, a square, an oblong, a cube, a cuboid, a vector, a column, a row, a filter, a channel, or the like. In some embodiments, the sparse matrix can be divided into blocks according to a hyper parameter, such as a compression ratio, distribution of non-zero elements, sparsifying method, memory requirement, or the like. Sparse matrix can include a number of non-zero elements distributed randomly or regularly in the matrix. A block of the sparse matrix can include one or more non-zero elements or does not include any non-zero element. With reference to FIG. 3, for example, the sparse matrix 301 can be a 2D 6×9 matrix, including a number of non-zero elements, e.g., $NZ_0$, $NZ_1$, ..., $NZ_6$. Sparse matrix 301 can be divided into six 3×3 blocks, Block 0, Block 1, ..., Block 5.

At step 603, a first level BM is determined. The first level BM can indicate whether a block of the plurality of blocks includes a non-zero element. The first level BM can include a plurality of elements, e.g. the same number of elements as the number of blocks. Each element can correspond to one block and indicate whether the block includes a non-zero element. With reference to FIG. 3, for example, first level BM 3031 can include six elements, B0, B1, ..., B5, each of which can indicate whether a corresponding block, Block 0, Block 1, ..., or Block 5, includes a non-zero element or not. B0, B1, ..., and B5 corresponds to Block 0, Block 1, ..., and Block 5, respectively. B0 is set to 1 to indicate Block 0 has at least one non-zero element, while B1 is set to 0 to indicate Block 1 does not have any non-zero element, and so on. Although first level BM 3031 is shown as a vector, it can be of any other size or form.

At step 605, a second level BM is determined. The second level BM can indicate, for a block including a non-zero element, whether an element of the block is a non-zero element. The second level BM can include a plurality of parts. Each part can correspond to a block with non-zero element. In some embodiments, a part of second level BM can have the same size or form as that of its corresponding block. Each element of the part can indicate whether an element of the corresponding block is a non-zero element. For a block without a non-zero element or for a zero element in first level BM, second level BM does not have a corresponding part. The one or more parts of the second level BM can be arranged in a structure corresponding to that of first level BM. Elements of a part can be arranged in a structure corresponding to that of corresponding block.

With reference to FIG. 3, for example, part 3032a of second level BM 3032 corresponds to B3 of first level BM 3031 or Block 3 of sparse matrix 301. Block 3 of spare matrix 301 includes two non-zero elements, $NZ_3$ at position (0, 0) and $NZ_4$ at position (2, 0). Part 3032a of second level BM 3032 can include two elements, E(0, 0) at position (0, 0) and E(2, 0) at position (2, 0), that are set to 1 to indicate that there are non-zero elements at these positions. Although shown as a 3×N matrix, second level BM 3032 can be of any other size or form.

At step 607, an element array including non-zero elements in the sparse matrix can be formed. The non-zero elements can be arranged in a structure corresponding to that of second level BM. With reference to FIG. 3, for example, $NZ_3$, $NZ_4$ are arranged to correspond to part 3032a of second level BM 3032 that is corresponding to B3 of first level BM 3031 and thus to Block 3 of sparse matrix 301. Specifically, $NZ_3$ and $NZ_4$ are corresponding to E(0, 0) and E(2, 0) in part 3032a of second level BM 3032, respectively.

In some embodiments, method 600 can also include determining a size or form of a block in the plurality of blocks according to a hyper parameter, such as a compression ratio, distribution of non-zero elements, sparsifying method, memory requirement, or the like.

In some embodiments, method 600 can also include pruning a matrix associated with the neural network to obtain the sparse matrix. For example, the matrix can be pruning by using sparsifying 110 of FIG. 1A, sparsifying 120 of FIG. 1B, or the like.

In some embodiments, method 600 can also include dividing a part of second level BM into a plurality of sub-blocks, determining a first sub-level BM including a plurality of elements to indicate whether a sub-block of the part of second level BM includes a non-zero element, and determining a second sub-level BM including one or more parts to indicate, for a sub-block with a non-zero element, whether an element of the sub-block is a non-zero element. In some embodiments, for a sub-block without a non-zero element or for a zero element in first sub-level BM, second sub-level does not have a corresponding part. The structure of first sub-level BM can be corresponding to that of second level BM, and the structure of second sub-level BM can be corresponding to that of the first sub-level BM. With reference to FIG. 3, for example, part 3032a of second level BM 3032 can be divided into three columns. First sub-level BM 3032a-1 can include three elements, C0, C1 and C2, to indicate whether a column of part 3032a includes a non-zero element. C0, C1 and C2 are corresponding to left, middle and right columns of part 3032a, respectively. Since the left column of part 3032a includes two non-zero elements, E(0, 0) and E(2, 0), and the middle and right columns of part 3032a only include zero elements, C0 is set to 1, while C1 and C2 are both set to 0. Second sub-level BM 3032a-2 has one part corresponding to C0 of first sub-level BM 3032a-1 and left column of second level BM 3032. The part of second sub-level BM 3032a-2 can include three elements (1, 0, 1) corresponding to three elements in left column of part 3032a of second level BM 3032 and indicating whether they are non-zero elements.

It is appreciated that, in some embodiments, method 600 can include determining more deep sub-level BMs. For example, second sub-level BM can be divided into a plurality of sub-blocks, and represented by other deeper sub-level BMs.

In some embodiments, method 600 can include combining at least two of first level BM, second level BM and element array with each other.

Figure 7:
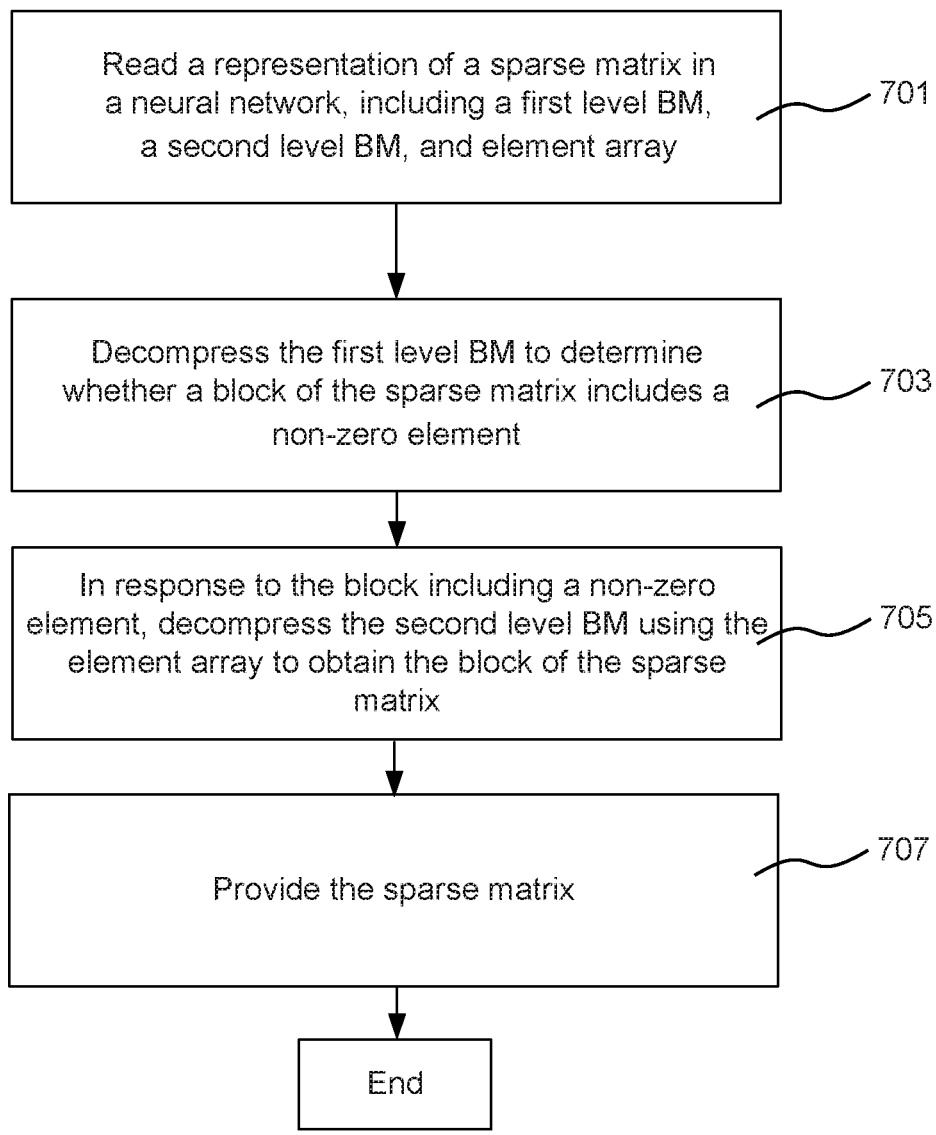
FIG. 7 is a flowchart of an exemplary method for decompressing a representation of a sparse matrix in a neural network, according to some embodiments of the present disclosure.

FIG. 7 is a flowchart of an exemplary method 700 for decompressing a representation of a sparse matrix in a neural network, according to some embodiments of the present disclosure. Method 700 can be implemented by neural network HAPU architecture 200 of FIG. 2A or FIG. 2C or sparse engine 590 of FIGS. 5A-5B. Moreover, method 700 can also be implemented by a computer program product, embodied in a computer-readable medium, including computer-executable instructions, such as program code, executed by computers.

As shown in FIG. 7, at step 701, a representation of a sparse matrix in a neural network can be read. The representation can include a first level BM, a second level BM, and element array. In some embodiments, the representation can also include one or more sub-level BMs. For example, sparse engine 590 of FIG. 5A can read a representation of a sparse matrix in a neural network (e.g., representation 303 of FIG. 3, representation 403 of FIG. 4, or the like), including first level BM 521 (e.g. first level BM 3031 of FIG. 3, first level BM 4031 of FIG. 4, or the like), second level BM 522 (e.g. second level BM 3032 of FIG. 3, second level BM 4032 of FIG. 4, or the like) and element array 523 (e.g. element array 3033 of FIG. 3, element array 4033 of FIG. 4, or the like). The representation can also include one or more sub-level BMs (e.g., first sub-level BM 3032a-1, second sub-level BM 3032a-2, more sub-level BMs 3032a-n of FIG. 3, first sub-level BM 4032-1, second sub-level BM 4032-2 of FIG. 4, or the like).

At step 703, the first level BM can be decompressed to determine whether a block of the sparse matrix includes a non-zero element. The sparse matrix includes a plurality of blocks. Decompressing the first level BM can include checking each element of the first level BM. In some embodiments, an element of the first level BM is set to 1 to indicate its corresponding block includes a non-zero element. For example, sparse engine 590 of FIG. 5A (e.g., first level decompressor 591) can decompress first level BM 3031 of FIG. 3, e.g., checking each element, B0, B1, . . . , or B5, of first level BM 3031, to determine whether a block of sparse matrix 301 includes a non-zero element. Elements B0, B2-4 are set to 1, indicating that Block 0 and Blocks 2-4 of sparse matrix 301 have non-zero elements, while B1 and B5 are set to 0, indicating that Block 1 and Block 5 of sparse matrix 301 do not have any non-zero element.

At step 705, in response to the block including a non-zero element, the second level BM can be decompressed using element array to obtain the block of sparse matrix. In some embodiments, the second level BM can be used as bitmask to reconstruct the sparse matrix with element array. An element of the second level BM is set to 1 to indicate its corresponding element is a non-zero element included in the element array. In some embodiments, obtained blocks can be combined to obtain the sparse matrix or a variant thereof. For example, sparse engine 590 of FIG. 5B (e.g., second level decompressor 592) can decompress second level BM 3032 of FIG. 3 with element array 3033, to obtain Block 0 and Blocks 2-4 of sparse matrix 301. With reference to FIG. 3, for part 3032a that corresponds to B3 or Block 3, elements E(0, 0) and E(2, 0) are set to 1 and corresponding to non-zero elements $NZ_3$ and $NZ_4$, respectively, of element array 3033. Sparse engine 590 of FIG. 5B (e.g., second level decompressor 592) can reconstruct Block 3 by placing $NZ_3$ and $NZ_4$ at positions (0, 0) and (2, 0), respectively, and filling all other positions with 0s. Similarly, Block 0, Block 2 and Block 4 can also be reconstructed. Sparse engine 590 of FIG. 5B (e.g., first level decompressor 591) can combine obtained blocks, Block 0 and Blocks 2-4, to obtain the sparse matrix 301.

At step 707, the sparse matrix can be provided. In some embodiments, the provided sparse matrix can be the same as original sparse matrix or a variant of the original sparse matrix.

In some embodiments, method 700 can also include decompressing the first sub-level BM to determine whether a sub-block of a part of second level BM includes a non-zero element, and in response to the sub-block including a non-zero element, decompressing the second sub-level BM to obtain the sub-block of the part of second level BM. For example, in combination with FIG. 3 and FIGS. 5A-B, representation 303 can include first sub-level BM 3032a-1 and second sub-level BM 3032a-2. Sparse engine 590 (e.g., first level decompressor 591) can decompress first sub-level BM 3032a-1, e.g., checking each element, C0, C1 or C2, of first sub-level BM 3032a-1, to determine whether a sub-block (e.g., column) of part 3032a includes a non-zero element. Element C0 is set to 1, indicating that the left column of part 3032a has one or more non-zero elements, while C1 and C2 are set to 0, indicating that the middle and right columns of part 3032a do not have any non-zero element. For element C0 of first sub-level BM 3032a-1 or for the left column of part 3032a, sparse engine 590 (e.g., second level decompressor 592) can reconstruct the left column of part 3032a with second sub-level BM 3032a-2, the middle and right columns of part 3032a with 0s. Similarly, sparse engine 590 can reconstruct other parts of the second level BM 3032, and decompress the second level BM 3032 to obtain sparse matrix 301.

Embodiments of the present disclosure can bring many technical advantages. For example, hierarchical representation of a sparse matrix of some embodiments of present disclosure can reduce memory storage. In addition, the hierarchical representation can be hardware friendly, resulting in simple decompression process and higher decompression throughput.

In some embodiments of the present disclosure, a hyper parameter can be used to control granularity of the sparsity in neutral network. In some embodiments, hierarchical representation of a sparse matrix can represent structured sparsity in a level (e.g., first level BM) and un-structured sparsity in another level (e.g., second level BM). This can improve the efficiency of storage of and computation on the sparse matrix.

It is appreciated that the embodiments disclosed herein can be used in various application environments, such as artificial intelligence (AI) training and inference, database and big data analytic acceleration, video compression and decompression, and the like. AI-related applications can involve neural network-based machine learning (ML) or deep learning (DL). Therefore, the embodiments of the present disclosure can be used in various neural network architectures, such as deep neural networks (DNNs), convolutional neural networks (CNNs), recurrent neural networks (RNNs), or the like. For example, some embodiments of present disclosure can be used in AI inference of DNN.

Embodiments of the present disclosure can be applied to many products. For example, some embodiments of the present disclosure can be applied to Ali-NPU (e.g., Hanguang NPU), Ali-Cloud, Ali PIM-AI (Processor-in Memory for AI), Ali-DPU (Database Acceleration Unit), Ali-AI platform, Ali-Data Center AI Inference Chip, IoT Edge AI Chip, GPU, TPU, or the like.

The embodiments may further be described using the following clauses:

1. A method of representing a sparse matrix in a neural network, comprising:
dividing the sparse matrix into a plurality of blocks;
determining a first level bitmap to indicate whether a block of the plurality of blocks comprises a non-zero element;
determining a second level bitmap to indicate, for a block comprising a non-zero element, whether an element of the block is a non-zero element; and
forming an element array comprising non-zero elements in the sparse matrix.

2. The method of clause 1, wherein the sparse matrix is a sparse weight matrix or a sparse activation matrix, or the block is a square, an oblong, a cube, a cuboid, a vector, a column, a row, a filter, or a channel.

3. The method of clause 1 or clause 2, further comprising:
pruning a matrix associated with the neural network to obtain the sparse matrix.

4. The method of any of clauses 1-3, further comprising:
determining a size or form of a block in the plurality of blocks according to at least one of compression ratio, distribution of non-zero elements, sparsifying method, and memory requirement.

5. The method of any of clauses 1-4, wherein determining the first bitmap comprises:
determining a plurality of elements, each element corresponding to one block and indicating whether the one block includes a non-zero element.

6. The method of any of clauses 1-5, wherein determining the second bitmap comprises:
determining, for each block comprising a non-zero element, a part with a plurality of elements to indicate whether corresponding elements of the block are non-zero elements; and
combining one or more determined parts to form the second bitmap.

7. The method of any of clauses 1-6, further comprising:
dividing a part of second level bitmap into a plurality of sub-blocks;
determining a first sub-level bit map including a plurality of elements to indicate whether a sub-block of the part of second level bitmap includes a non-zero element; and
determining a second sub-level bitmap including one or more parts to indicate, for a sub-block with a non-zero element, whether an element of the sub-block is a non-zero element.

8. The method of any of clauses 1-7, further comprising:
combining at least two of the first level bitmap, the second level bitmap and the element array with each other.

9. A method of executing a neural network, comprising:
reading a representation of a sparse matrix, the representation comprising a first level bitmap, a second level bitmap, and an element array;
decompressing the first level bitmap to determine whether a block of the sparse matrix comprises a non-zero element;
in response to the block comprising a non-zero element, decompressing the second level bitmap using the element array to obtain the block of the sparse matrix; and
executing the neural network with the sparse matrix.

10. The method of clause 9, wherein decompressing the first level bitmap comprises:
checking each element of the first level bitmap to determine whether a corresponding block of the sparse matrix comprises a non-zero element.

11. The method of clause 9 or clause 10, wherein decompressing the second level bitmap comprises:
using the second level bitmap as a bitmask to reconstruct the sparse matrix with the element array.

12. The method of any of clauses 9-11, wherein the representation comprises a first sub-level bitmap and a second sub-level bitmap, and the method further comprises:
decompressing the first sub-level bitmap to determine whether a sub-block of a part of the second level bitmap comprises a non-zero element; and
in response to the sub-block comprising a non-zero element, decompressing the second sub-level bitmap to obtain the sub-block of the part of second level bitmap.

13. An operation unit, comprising:
a buffer for storing a representation of a sparse matrix in a neural network;

a sparse engine communicatively coupled with the buffer, the sparse engine including circuitry to:
   read the representation of the sparse matrix from the buffer, the representation comprising a first level bitmap, a second level bitmap, and an element array;
   decompress the first level bitmap to determine whether a block of the sparse matrix comprises a non-zero element; and
   in response to the block comprising a non-zero element, decompress the second level bitmap using the element array to obtain the block of the sparse matrix; and
a processing array communicatively coupled with the sparse engine, the processing array comprising circuitry to execute the neural network with the sparse matrix.

14. The operation unit of clause 13, wherein the sparse engine includes circuitry to:
check each element of the first level bitmap to determine whether corresponding block of the sparse matrix comprises a non-zero element.

15. The operation unit of clause 13 or clause 14, wherein the sparse engine includes circuitry to:
use the second level bitmap as a bitmask to reconstruct the sparse matrix with the element array.

16. The operation unit of any of clauses 13-15, wherein the representation comprises a first sub-level bitmap and a second sub-level bitmap, and the sparse engine includes circuitry to:
decompress the first sub-level bitmap to determine whether a sub-block of a part of the second level bitmap comprises a non-zero element; and
in response to the sub-block comprising a non-zero element, decompress the second sub-level bitmap to obtain the sub-block of the part of second level bitmap.

17. The operation unit of any of clauses 13-16, wherein the sparse engine comprises:
a first level decompressor including circuitry to decompress the first level bitmap; and
a second level decompressor communicatively coupled with the first level decompressor and including circuitry to decompress the second level bitmap.

18. The operation unit of claim 13-17, wherein the processing array comprises a plurality of layers, at least one of the plurality of layers including circuitry to execute the neural network with the sparse matrix.

19. A processing core, comprising:
a local memory; and
an operation unit communicatively coupled with the local memory, the operation unit comprising:
   a buffer for storing a representation of a sparse matrix in a neural network;
   a sparse engine communicatively coupled with the buffer, the sparse engine including circuitry to:
     read the representation of the sparse matrix from the buffer, the representation comprising a first level bitmap, a second level bitmap, and an element array;
     decompress the first level bitmap to determine whether a block of the sparse matrix comprises a non-zero element; and
     in response to the block comprising a non-zero element, decompress the second level bitmap using the element array to obtain the block of the sparse matrix; and
   a processing array communicatively coupled with the sparse engine, the processing array comprising circuitry to execute the neural network with the sparse matrix.

20. The processing core of clause 19, wherein the sparse engine includes circuitry to:
check each element of the first level bitmap to determine whether corresponding block of the sparse matrix comprises a non-zero element.

21. The processing core of clause 19 or clause 20, wherein the sparse engine includes circuitry to:
use the second level bitmap as a bitmask to reconstruct the sparse matrix with the element array.

22. The processing core of any of clauses 19-21, wherein the representation comprises a first sub-level bitmap and a second sub-level bitmap, and the sparse engine includes circuitry to:
decompress the first sub-level bitmap to determine whether a sub-block of a part of the second level bitmap comprises a non-zero element; and
in response to the sub-block comprising a non-zero element, decompress the second sub-level bitmap to obtain the sub-block of the part of second level bitmap.

23. The processing core of any of clauses 19-22, wherein the sparse engine comprises:
a first level decompressor including circuitry to decompress the first level bitmap; and
a second level decompressor communicatively coupled with the first level decompressor and including circuitry to decompress the second level bitmap.

24. The processing core of any of clauses 19-23, wherein the processing array comprises a plurality of layers, at least one of the plurality of layers including circuitry to execute the neural network with the sparse matrix.

25. A non-transitory computer readable storage medium storing a set of instructions that are executable by one or more processing devices to cause an apparatus to perform a method comprising:
dividing the sparse matrix into a plurality of blocks;
determining a first level bitmap to indicate whether a block of the plurality of blocks comprises a non-zero element;
determining a second level bitmap to indicate, for a block comprising a non-zero element, whether an element of the block is a non-zero element; and
forming an element array comprising non-zero elements in the sparse matrix.

26. The non-transitory computer readable storage medium of clause 25, wherein the sparse matrix is a sparse weight matrix or a sparse activation matrix, or the block is a square, an oblong, a cube, a cuboid, a vector, a column, a row, a filter, or a channel.

27. The non-transitory computer readable storage medium of clause 25 or clause 26, wherein the set of instructions are executable by one or more processing devices to cause the apparatus to further perform:
pruning a matrix associated with the neural network to obtain the sparse matrix.

28. The non-transitory computer readable storage medium of any of clauses 25-27, wherein the set of instructions are executable by one or more processing devices to cause the apparatus to further perform:
determining a size or form of a block in the plurality of blocks according to at least one of compression ratio, distribution of non-zero elements, sparsifying method, and memory requirement.

29. The non-transitory computer readable storage medium of any of clauses 25-28, wherein determining the first bitmap comprises:

determining a plurality of elements, each element corresponding to one block and indicating whether the block includes a non-zero element.

30. The non-transitory computer readable storage medium of any of clauses 25-29, wherein determining the second bitmap comprises:

determining, for each block comprising a non-zero element, a part with a plurality of elements to indicate whether corresponding elements of the block are non-zero element; and combining determined parts to form the second bitmap.

31. The non-transitory computer readable storage medium of any of clauses 25-30, wherein the set of instructions are executable by one or more processing devices to cause the apparatus to further perform:

dividing a part of second level bitmap into a plurality of sub-blocks;

determining a first sub-level bit map including a plurality of elements to indicate whether a sub-block of the part of second level bitmap includes a non-zero element; and determining a second sub-level bitmap including one or more parts to indicate, for a sub-block with a non-zero element, whether an element of the sub-block is a non-zero element.

32. The non-transitory computer readable storage medium of any of clauses 25-31, wherein the set of instructions are executable by one or more processing devices to cause the apparatus to further perform:

combining at least two of the first level bitmap, the second level bitmap and the element array with each other.

33. A non-transitory computer readable storage medium storing a set of instructions that are executable by one or more processing devices to cause an operation unit to perform a method comprising:

reading a representation of a sparse matrix in a neural network, the representation comprising a first level bitmap, a second level bitmap, and an element array;

decompressing the first level bitmap to determine whether a block of the sparse matrix comprises a non-zero element;

in response to the block comprising a non-zero element, decompressing the second level bitmap using the element array to obtain the block of the sparse matrix; and executing the neural network with the sparse matrix.

34. The non-transitory computer readable storage medium of clause 33, wherein decompressing the first level bitmap comprises:

checking each element of the first level bitmap to determine whether corresponding block of the sparse matrix comprises a non-zero element.

35. The non-transitory computer readable storage medium of clause 33 or clause 34, wherein decompressing the second level bitmap comprises:

using the second level bitmap as a bitmask to reconstruct the sparse matrix with element array.

36. The non-transitory computer readable storage medium of any of clauses 33-35, wherein the representation comprises a first sub-level bitmap and a second sub-level bitmap, and wherein the set of instructions are executable by one or more processing devices to cause the operation unit to further perform:

decompressing the first sub-level bitmap to determine whether a sub-block of a part of the second level bitmap comprises a non-zero element; and in response to the sub-block comprising a non-zero element, decompressing the second sub-level bitmap to obtain the sub-block of the part of second level bitmap.

The various example embodiments described herein are described in the general context of method steps or processes, which may be implemented in one aspect by a computer program product, embodied in a computer readable medium, including computer-executable instructions, such as program code, executed by computers in networked environments. A computer readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the present disclosure are apparent from the detailed specification, and thus, it is intended that the appended claims cover all systems and methods falling within the true spirit and scope of the present disclosure. As used herein, the indefinite articles "a" and "an" mean "one or more." Further, since numerous modifications and variations will readily occur from studying the present disclosure, it is not desired to limit the present disclosure to the exact reconstruction and operation illustrated and described, and accordingly, all suitable modifications and equivalents may be resorted to, falling within the scope of the present disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An operation unit, comprising:
a buffer for storing a representation of a sparse matrix in a neural network;
a sparse engine communicatively coupled with the buffer, the sparse engine including circuitry to:
read the representation of the sparse matrix from the buffer, the representation comprising a first level bitmap, a second level bitmap, and an element array;
decompress the first level bitmap to determine whether a block of the sparse matrix comprises a non-zero element, the block of the sparse matrix comprising multiple elements; and
in response to the block comprising a non-zero element, decompress the second level bitmap using the element array to obtain the block of the sparse matrix; and
a processing array communicatively coupled with the sparse engine, the processing array comprising circuitry to execute the neural network with the sparse matrix.

2. The operation unit of claim 1, wherein the sparse engine includes circuitry to:
check each element of the first level bitmap to determine whether corresponding block of the sparse matrix comprises a non-zero element.

3. The operation unit of claim 1, wherein the sparse engine includes circuitry to:
use the second level bitmap as a bitmask to reconstruct the sparse matrix with the element array.

4. The operation unit of claim 1, wherein the representation comprises a first sub-level bitmap and a second sub-level bitmap, and the sparse engine includes circuitry to:
decompress the first sub-level bitmap to determine whether a sub-block of a part of the second level bitmap comprises a non-zero element; and
in response to the sub-block comprising a non-zero element, decompress the second sub-level bitmap to obtain the sub-block of the part of second level bitmap.

5. The operation unit of claim 1, wherein the sparse engine comprises:
a first level decompressor including circuitry to decompress the first level bitmap; and
a second level decompressor communicatively coupled with the first level decompressor and including circuitry to decompress the second level bitmap.

6. The operation unit of claim 1, wherein the processing array comprises a plurality of layers, at least one of the plurality of layers including circuitry to execute the neural network with the sparse matrix.

7. A processing core, comprising:
a local memory; and
an operation unit communicatively coupled with the local memory, the operation unit comprising:
a buffer for storing a representation of a sparse matrix in a neural network;
a sparse engine communicatively coupled with the buffer, the sparse engine including circuitry to:
read the representation of the sparse matrix from the buffer, the representation comprising a first level bitmap, a second level bitmap, and an element array;
decompress the first level bitmap to determine whether a block of the sparse matrix comprises a non-zero element, the block of the sparse matrix comprising multiple elements; and
in response to the block comprising a non-zero element, decompress the second level bitmap using the element array to obtain the block of the sparse matrix; and
a processing array communicatively coupled with the sparse engine, the processing array comprising circuitry to execute the neural network with the sparse matrix.

8. The processing core of claim 7, wherein the sparse engine includes circuitry to:
check each element of the first level bitmap to determine whether corresponding block of the sparse matrix comprises a non-zero element.

9. The processing core of claim 7, wherein the sparse engine includes circuitry to:
use the second level bitmap as a bitmask to reconstruct the sparse matrix with the element array.

10. The processing core of claim 7, wherein the representation comprises a first sub-level bitmap and a second sub-level bitmap, and the sparse engine includes circuitry to:
decompress the first sub-level bitmap to determine whether a sub-block of a part of the second level bitmap comprises a non-zero element; and
in response to the sub-block comprising a non-zero element, decompress the second sub-level bitmap to obtain the sub-block of the part of second level bitmap.

11. The processing core of claim 7, wherein the sparse engine comprises:
a first level decompressor including circuitry to decompress the first level bitmap; and
a second level decompressor communicatively coupled with the first level decompressor and including circuitry to decompress the second level bitmap.

12. The processing core of claim 7, wherein the processing array comprises a plurality of layers, at least one of the plurality of layers including circuitry to execute the neural network with the sparse matrix.

13. A method of executing a neural network, comprising:
reading a representation of a sparse matrix, the representation comprising a first level bitmap, a second level bitmap, and an element array;
decompressing the first level bitmap to determine whether a block of the sparse matrix comprises a non-zero element, the block of the sparse matrix comprising multiple elements;
in response to the block comprising a non-zero element, decompressing the second level bitmap using the element array to obtain the block of the sparse matrix; and
executing the neural network with the sparse matrix.

14. The method of claim 13, wherein decompressing the first level bitmap comprises:
checking each element of the first level bitmap to determine whether a corresponding block of the sparse matrix comprises a non-zero element.

15. The method of claim 13, wherein decompressing the second level bitmap comprises:
using the second level bitmap as a bitmask to reconstruct the sparse matrix with the element array.

16. The method of claim 13, wherein the representation comprises a first sub-level bitmap and a second sub-level bitmap, and the method further comprises:
- decompressing the first sub-level bitmap to determine whether a sub-block of a part of the second level bitmap comprises a non-zero element; and
- in response to the sub-block comprising a non-zero element, decompressing the second sub-level bitmap to obtain the sub-block of the part of second level bitmap.

17. A non-transitory computer readable storage medium storing a set of instructions that are executable by one or more processing devices to cause an operation unit to perform a method comprising:
- reading a representation of a sparse matrix in a neural network, the representation comprising a first level bitmap, a second level bitmap, and an element array;
- decompressing the first level bitmap to determine whether a block of the sparse matrix comprises a non-zero element, the block of the sparse matrix comprising multiple elements;
- in response to the block comprising a non-zero element, decompressing the second level bitmap using the element array to obtain the block of the sparse matrix; and
- executing the neural network with the sparse matrix.

18. The non-transitory computer readable storage medium of claim 17, wherein the set of instructions are executable by one or more processing devices to cause an operation unit to perform:
- checking each element of the first level bitmap to determine whether a corresponding block of the sparse matrix comprises a non-zero element.

19. The non-transitory computer readable storage medium of claim 17, wherein the set of instructions are executable by one or more processing devices to cause an operation unit to perform:
- using the second level bitmap as a bitmask to reconstruct the sparse matrix with the element array.

20. The non-transitory computer readable storage medium of claim 17, wherein the representation comprises a first sub-level bitmap and a second sub-level bitmap, and wherein the set of instructions are executable by one or more processing devices to cause an operation unit to perform:
- decompressing the first sub-level bitmap to determine whether a sub-block of a part of the second level bitmap comprises a non-zero element; and
- in response to the sub-block comprising a non-zero element, decompressing the second sub-level bitmap to obtain the sub-block of the part of second level bitmap.

* * * * *